United States Patent [19]
Ueyanagi

[11] Patent Number: 5,490,421
[45] Date of Patent: Feb. 13, 1996

[54] SEMI-CONDUCTOR ACCELERATION SENSOR HAVING THIN BEAM SUPPORTED WEIGHT

[75] Inventor: Katsumichi Ueyanagi, Kanagawa, Japan

[73] Assignees: Fuji Electric Co., Ltd., Kanagawa; Fujitsu Ten Limited, Hyogo, both of Japan

[21] Appl. No.: 376,051

[22] Filed: Jan. 23, 1995

Related U.S. Application Data

[63] Continuation of Ser. No. 36,697, Mar. 25, 1993, abandoned.

[30] Foreign Application Priority Data

Mar. 25, 1992 [JP] Japan ........................................ 4-66470
Aug. 27, 1992 [JP] Japan ........................................ 4-227651

[51] Int. Cl.⁶ ........................................................ G01P 15/12
[52] U.S. Cl. .......................................... 73/514.33; 73/514.29; 338/2
[58] Field of Search ........................... 73/517 R, 517 AV, 73/517 A, 510, 514; 338/2, 5, 43, 46, 47

[56] References Cited

U.S. PATENT DOCUMENTS

| | | | |
|---|---|---|---|
| 4,129,042 | 12/1978 | Rosvold | 73/517 R |
| 4,522,072 | 6/1985 | Sulouff et al. | 73/517 R |
| 4,553,436 | 11/1985 | Hansson | 73/517 R |
| 4,641,539 | 2/1987 | Vilimek | 73/517 R |
| 5,103,667 | 4/1992 | Allen et al. | 73/1 D |
| 5,223,086 | 6/1993 | Terada et al. | 73/517 R |
| 5,233,213 | 8/1993 | Marek | 73/517 R |
| 5,251,485 | 10/1993 | Kondo | 73/517 R |

FOREIGN PATENT DOCUMENTS

| | | |
|---|---|---|
| 0368446 | 5/1990 | European Pat. Off. . |
| 0492986 | 7/1992 | European Pat. Off. . |
| 3009091 | 9/1981 | Germany . |
| 56-142429 | 11/1981 | Japan . |
| 4-225166 | 8/1992 | Japan . |
| 4-269659 | 9/1992 | Japan . |
| 4-299267 | 10/1992 | Japan . |

OTHER PUBLICATIONS

Copy of British Office Action re corresponding UK application No. 9306077.0.
British Search Report dated 21 Jun. 1993.

*Primary Examiner*—R. Raevis
*Assistant Examiner*—Helen C. Kwok
*Attorney, Agent, or Firm*—Finnegan, Henderson, Farabow, Garrett & Dunner

[57] ABSTRACT

The semiconductor acceleration sensor comprises a thick weight 100 made of a semiconductor, a thick support member 120 surrounding the weight, and first and second sets of paired thin beams which connect the weight with the support member. The first and second sets consist of paired beams 111 and 113, and a pair of beams 112 and 114, respectively. In each of the beam sets, the two beams are positioned so that, when one of them is rotated by 180 degree about the center of the weight, this beam coincides with the other beam. On the upper faces of the beams, for example, on the upper faces in the side of connecting the beams with the support member, strain gauges 131, 133, 135 and 137 of a first type are formed in the longitudinal direction of the respective beam, and strain gauges 132, 134, 136 and 138 of a second type are formed in the width direction. Thereby it is possible to reduce the level of an interference output, and improve an impact resistance.

24 Claims, 15 Drawing Sheets

SEMI-CONDUCTOR ACCELERATION SENSOR HAVING THIN BEAM SUPPORTED WEIGHT

This application is a continuation, of application Ser. No. 08/036,697, filed Mar. 25, 1993, now abandoned.

BACKGROUND OF THE INVENTION

This invention relates to an acceleration micro-sensor which is made of a semiconductor.

A conventional semiconductor acceleration sensor is shown in FIGS. 12A and 12B. FIG. 12A is a perspective view and FIG. 12B is a circuit diagram. In FIG. 12A, the semiconductor acceleration sensor comprises a quadrangular prism-like thick weight 10 made of a semiconductor and having a thickness of, for example, 400 microns, a thick support member 12 which is separated by a predetermined gap from the weight 10 and formed so as to surround it, and a thin beam 11 which connects one side face of the weight 10 with that of the support-member 12 facing the one side face and which has a thickness of, for example, 10 to 40 microns. Strain gauges 31, 32, 33 and 34 are formed on the upper face of the beam 11. The strain gauges 31 and 33 are formed in the side of connecting it with the weight 10 and in the longitudinal direction of the beam 11, and the strain gauges 32 and 34 are formed in the width direction of the beam 11. These strain gauges 31 to 34 are electrically connected as shown in FIG. 12B to constitute a Wheatstone bridge in which the strain gauges 31 and 33 are opposite to each other and the strain gauges 32 and 34 are opposite to each other. In FIG. 12B, V designates a power supply terminal, and $S_1$ and $S_2$ designate signal output terminals.

When acceleration in the vertical direction (which is the direction of detecting acceleration) is applied to the weight 10, the weight 10 is subjected to a force in the vertical direction and the beam 11 deflects in the direction indicated by arrow P. At this time, a tensile stress acts on the upper face of the beam 11, so that the resistance of each of the strain gauges 31 and 33 formed in the longitudinal direction of the beam 11 increases, and, in contrast, the resistance of each of the strain gauges 32 and 34 formed in the width direction of the beam 11 does not change. This causes a detection signal the level of which is proportional to the magnitude of the acceleration, to be output from the signal output terminals $S_1$ and $S_2$ of the Wheatstone bridge.

Because of the configuration where the weight 10 is supported at only one end, the semiconductor acceleration sensor has an impaired impact strength. As shown in FIG. 13, therefore, such a semiconductor acceleration sensor is usually accommodated in a hermetically sealed container 850 which contains a damping liquid 830. In FIG. 13, 800 designates the semiconductor acceleration sensor and 820 designates an amplifier for a detection signal.

In the semiconductor acceleration sensor mentioned above, as shown in FIG. 14, the deflection center line 13 of the beam 11 is separated by a distance L from the center of gravity G of the weight 10. When acceleration in the transverse direction (which is the direction of not detecting acceleration) is applied to the weight 10, therefore, a moment indicated by arrow M is generated by this acceleration and the distance L to be applied to the weight 10 so that the weight 10 is subjected to a force in the vertical direction in the same manner as the case where acceleration in the vertical direction is applied, thereby deflecting the beam 11 in the direction indicated by arrow P. This deflection causes the Wheatstone bridge to output a signal, and this signal output functions as an interference output to impair the detection accuracy.

As a countermeasure to this problem, a configuration may be proposed in which, as shown in FIG. 15, an additional weight 14 made of glass or the like is jointed to the upper face of the weight 10 so that the center of gravity G of the weight consisting of the weight 10 and the additional weight 14 exists on the deflection center line 13 of the beam 11, thereby reducing the distance L therebetween to zero. However, this improved configuration has a problem in that an extra process step of joining the additional weight is required .and the production cost is increased.

In the production of a semiconductor acceleration sensor such as that shown in FIG. 12 or 15, the weight 10, the support member 12 and the beam 11 are formed by engraving both the upper and lower faces of a semiconductor substrate using working means such as a plasma etching apparatus. In such a plasma etching process, because of its working characteristics, the etching proceeds at a high rate when the working width is large and proceeds at a low rate when the working width is small. In the case that different working widths exist in a semiconductor substrate under the working process as indicated by $W_3$ and $W_4$ in FIG. 16, therefore, different engraving depths are obtained as indicated by $D_3$ and $D_4$. This raises a problem in that the accuracy of the engraving process is lowered, thereby reducing the production yield.

In order to improve the impact resistance, the above-mentioned semiconductor acceleration sensors are usually accommodated in a hermetically sealed container which contains a damping liquid. The existence of the damping liquid causes the detection sensitivity to be reduced, and therefore it is required to estimate the reduction rate and to adjust the sensitivity before introducing the damping liquid into the container. Since the viscosity and compressibility of the damping liquid change depending on the pressure and temperature, however, sensitivities vary to arise a further problem in that the production yield is impaired.

Furthermore, FIGS. 22 and 23 illustrate another conventional semiconductor acceleration sensor by way of example: FIG. 22 is a top view and FIG. 23 a side view. As shown in FIGS. 22 and 23, the semiconductor acceleration sensor comprises a thick-walled square weight 901 which is, for example, 400 microns thick, a thick-walled square support 906 set a predetermined space apart from one side of the weight, and a thin-walled beam 907 which is, for example, 20 to 40 microns thick, the beam coupling the one side of the weight 901 and an opposed side of the support 906. Strain gauges 907A, 907B, 907C, 907D are formed in the beam 907. The stain gauges 907A, 907C among them are formed in the top surface of the junction between the beam 907 and the support 906 in the lengthwise direction of the beam 907, whereas the strain gauges 907B, 907D are formed in the top surface of the junction between the beam 907 and the weight 901 in the crosswise direction of the beam 907. Further, these strain gauges 907A, 907B, 907C, 907D are used to form the Wheatstone bridge by respectively setting the strain gauges 907A, 907C, and those 907B, 907D to face each other as shown in FIG. 26. In this case, E denotes a power supply terminal, G a ground terminal, and S1, S2 signal output terminals.

When acceleration is applied to the weight 901 in direction of arrow V in FIG. 23, that is, in a direction perpendicular to the weight 901 (the direction in which the acceleration is detected), the weight 901 receives vertical force Fv, thus causing the beam to bend down in direction of arrow M as shown in FIG. 27. At this time, tensile stress acts on the top surface of the junction between the beam 907 and the support 906 and that of the junction between the beam 907 and the weight 901. As a result, the resistances of the strain gages 907A, 907C formed in the lengthwise direction of the beam 907 increase, whereas those of the strain gauges 907B, 907D formed in the crosswise direction remain unchanged. Detection signals whose strength is proportional to the acceleration are thus output from the output terminals S1, S2 of the Wheatstone bridge.

As an ordinary diffusion technique is used for forming the strain gauges 907A, 907B, 907C, 907D, the surfaces of the weight 901, the beam 907 and the support 906 are covered with a passivation film 910 of SiO2, SiN or the like to protect them.

Since there exists a distance L from the strain centerline 909 of the beam 907 to the center of gravity W of the weight 901 in the acceleration sensor of FIG. 23, the distance L from the strain centerline 909 to the center of gravity W of the weight 901, and the crosswise force Fh produced in the weight 901 due to acceleration causes a moment when the acceleration is applied to the weight 901 crosswise (the direction in which acceleration is non-detected) as shown by an arrow H. Consequently, the beam 907 is caused to bend down in direction of arrow M as in a case where acceleration is applied vertically to the beam 907. In response to the strain, the Wheatstone bridge outputs a signal, which makes an interference output and lowers detection accuracy.

For the reason stated above, it may be considered remedial to reduce the distance L to zero by joining an additional weight 908 such as glass to the top surface of the weight 901 in order to make the center of gravity W of the combination of the weight 901 and the additional one 908 conform to the strain centerline 909 of the beam 907; however, the additional process step of joining them will increase the cost further.

Another problem arising from the aforementioned acceleration sensor is that detection sensitivity is low since the strain gauges formed in the top surface of the junction between the beam and the weight in the crosswise direction of the beam produce no resistance changes when acceleration is applied.

Moreover, the passivation film of SiO2, SiN or the like for the protection of the strain gauges is normally processed at high temperatures before being put back to the normal temperature. Notwithstanding, the difference in thermal expansion coefficient between the passivation film and the silicon semiconductor may cause the bending of the beam 907 as shown in FIG. 29 because of the stress generated on the surface of the silicon semiconductor when the normal temperature is restored. The situation in which acceleration has been applied is brought about when the beam is caused to bend and voltage is output from the Wheatstone bridge likewise. This voltage is called an offset output and lowers not only the S N ratio of the sensor output but also detection accuracy.

SUMMARY OF THE INVENTION

It is an object of the invention to provide a semiconductor acceleration sensor which can solve the above-mentioned problems, reduce the level of an interference output, and improve the working accuracy of the engraving process in the production. It is another object of the invention to provide a semiconductor acceleration sensor which has an improved impact resistance and which is not required to be accommodated in a hermetically sealed container that contains a damping liquid. Furthermore, another object of the present invention is to provide an acceleration sensor designed to improve detection sensitivity and to lower an interference output without the necessity of special process steps by solving the foregoing problems. And, furthermore, object of the present invention is to provide an acceleration sensor designed to lower offset voltage by means of passivation films.

In order to accomplish the above-mentioned objects, the semiconductor acceleration sensor according to the first aspect of the invention comprises: a thick weight made of a semiconductor; a thick support member separated by a predetermined gap from the weight and surrounds the weight; first and second pairs of thin beams which connect the outer periphery of the weight with the inner periphery of the support member, one beam of each of the pairs coinciding with the other beam of the pair when the one beam is rotated by 180 degrees about the center of the weight; and strain gauge means respectively formed on upper faces of the beams, the strain gauges comprising first type strain gauges being respectively formed on the upper faces of the beams in the side of connecting the beams with the support member and in the longitudinal direction of the respective beam and second type strain gauges being respectively formed on the upper faces of the beams in the side of connecting the beams with the support member and in the width direction of the respective beam.

According to the second aspect of the invention, the strain gauges constitute a Wheatstone bridge in which the strain gauges of the first type respectively formed on the first set of thin beams are opposed to the strain gauges of the first type respectively formed on the second set of thin beams, and the strain gauges of the second type respectively formed on the first set of beams are opposed to the strain gauges of the second type respectively formed on the second set of thin beams.

Alternatively, according to the third aspect of the invention, the weight, support member and beams are formed from one semiconductor substrate, and working widths of engraved portions for forming the weight, support member and beams and engraved from the upper and lower faces of the semiconductor substrate are identical with each other.

Alternatively, according to the fourth aspect of the invention, the support member comprises a plurality of signal terminals of one side which are connected to the strain gauges formed on the upper faces of the beams, and a plurality of dummy signal terminals of one side and having the same shape as the signal terminals of one side. The signal terminals and dummy signal terminals of one side are arranged in the periphery of the upper face of the support member at substantially equal intervals. The sensor further comprises a supporting substrate comprising a plurality of signal terminals and dummy signal terminals of the other side which are respectively opposed and connected to the signal terminals and dummy signal terminals of the one side. The supporting substrate functions to connect the strain gauges formed on the beams to the exterior through the signal terminals of the other side. The sum of the height of the signal terminals of one side and that of the signal terminals of the other side, and the sum of the height of the dummy signal terminals of one side and that of the dummy signal terminals of the other side are set to be a dimension which is slightly greater than the displacement amount of the weight during operation.

Alternatively, according to the fifth aspect of the invention, the sensor further comprises an additional weight and stopper disposed on the upper face of the weight and having an inverse convex shape. The outer periphery of the additional weight and stopper is greater than the inner periphery of the support member. The gap between the lower face of the outer periphery portion of the additional stopper and stopper and the upper face of the support member is set to be a dimension which is smaller than the allowable displacement amount of the weight.

Alternatively, according to the sixth aspect of the invention, the sensor further comprises a supporting substrate disposed on the lower face of the support member and has a recess which opens upward. The recess is greater than that of the weight. The gap between the face of the recess and the lower face of the weight is set to be a dimension which is slightly greater than the displacement amount of the weight during operation.

Alternatively, according to the seventh aspect of the invention, the sensor further comprises upper and lower supporting substrates. The upper supporting substrate is disposed on the upper face of the support member and has a recess which opens downward. The recess is greater than that of the weight, and a plural number of downward projections are formed in the recess and at locations which face the outer periphery of the weight. The lower supporting substrate is disposed on the lower face of the support member and has a recess which opens upward. The recess is greater than that of the weight, and a plural number of upward projections are formed in the recess and at locations which face the outer periphery of the weight. The gaps between,the upper and lower faces of the weight and the faces of the recesses of the upper and lower supporting substrates are set to be a dimension which is slightly greater than the displacement amount of the weight during operation. The gaps between the upper and lower faces of the weight and the projections formed in the recesses of the upper and lower supporting substrates are set to be a dimension which is smaller than the allowable displacement amount of the weight.

Alternatively, according to the eighth aspect of the invention, the sensor further comprises a supporting substrate disposed on the lower face .of the support member and has a recess which opens upward. The upper supporting substrate is disposed on the upper face of the support member and has a recess which opens downward. The recess is greater than that of the weight, and a downward projection is formed in the recess and at a location which faces the outer periphery of the weight. The lower supporting substrate is disposed on the lower face of the support member and has a recess which opens upward. The recess is greater than that of the weight, and an upward projection is formed in the recess and at a location which faces the outer periphery of the weight. The gaps between the upper and lower faces of the weight and the faces of the recesses of the upper and lower supporting substrates are set to be a dimension which is slightly greater than the displacement amount of the weight during operation. The gaps between the upper and lower faces of the weight and the projections formed in the recesses of the upper and lower supporting substrates are set to be a dimension which is smaller than the allowable displacement amount of the weight.

Alternatively, according to the ninth aspect of the present invention, the semiconductor acceleration sensor is formed of a semiconductor and includes a square thick-walled weight, a thick-walled support set a predetermined space apart from the weight and provided with an inner square opening formed in such a way as to surround the weight, four thin-walled beams for coupling four end sides on both opposed external sides of the weight to the respective opposed inner sides of the support, and strain gauges formed in the respective beams.

Further, according to tenth aspect of the invention, a semiconductor acceleration sensor is formed of a semiconductor and includes a weight having a square thick-walled central portion and four square thick-walled protrusions formed on the respective sides of the central portion, the sides thereof making a right angle with each other about the center of the central portion, a thick-walled support having an inner square opening set a predetermined space apart from the outer sides of the protrusions of the weight and formed in such a way as to surround the weight, four thin-walled beams for coupling the one sides of the protrusions of the weight, the sides thereof making a right angle with each other about the center of the central portion of the weight, and strain gauges formed in the respective beams.

The strain gauges formed in the four beams of the semiconductor acceleration sensor include four strain gauges on a first side, these four strain gauges being formed in the top surfaces of the junctions between the beams and the support in the lengthwise direction of the beams respectively, and four strain gauges on a second side, these four strain gauges being formed in the top surfaces of the junctions between the beams and the weight in the lengthwise direction thereof respectively. A Wheatstone bridge is set up by making two of the strain gauges out of the four strain gauges constituting the first side strain gauge respectively face the remaining two strain gauges symmetrically about the center point of the weight and by making two of the strain gauges out of the four strain gauges constituting the second side strain gauges respectively face the remaining two strain gauges symmetrically about the center point of the weight. Passivation films are provided on the surfaces of the respective beams with the strain gauges formed therein in the semiconductor acceleration sensor in which the strain gauges to be formed in the four beams are respectively formed in the top surfaces of the junctions between the beams and the support in the lengthwise direction of the beams.

Alternatively, the sensor is accommodated in a container which contains an inert gas.

In the semiconductor acceleration sensor of the first aspect of the invention, the beams consist of first and second sets of paired beams. In each of the sets, the paired beams are positioned in such a manner that, when one beam is rotated by 180 degree about the center of the weight, the one beam coincides with the other beam. Therefore, the weight is supported at two opposite ends by a pair of beams. When acceleration in the transverse direction (which is the direction of not detecting acceleration) is applied to the weight, therefore, the deflection of the beams is very smaller than that in a conventional sensor wherein the weight is supported at only one end, so that the level of an interference output is reduced and the impact resistance is improved.

In the semiconductor acceleration sensor of the second aspect of the invention, the strain gauges consist of strain gauges of a first type and strain gauges of a second type. The strain gauges of the first type are respectively formed on the upper faces of the beams in the side of connecting the beams with the support member and in the longitudinal direction of the respective beam. The strain gauges of the second type are respectively formed on the upper faces of the beams in the side of connecting the beams with the support member and in the width direction of the respective beam. These strain gauges constitute a Wheatstone bridge in which the strain gauges of the first type respectively formed on the first set of thin beams are opposed to the strain gauges of the first type respectively formed on the second set of thin beams, and the strain gauges of the second type respectively formed on the first set of beams are opposed to the strain gauges of the second type respectively formed on the second set of thin beams. When acceleration in the transverse direction (which is the direction of not detecting acceleration) is applied to the weight and a moment is applied to the weight, therefore, a force, for example, a compressive stress acts on the upper face of one of the paired beams which can be made coincide with each other by the rotation of 180 degree, and a tensile stress acts on the upper face of the other beam. In the Wheatstone bridge, therefore, the resistance of each of the strain gauges of the first type respectively formed on the upper faces of these beams change in such a manner that the changes in resistance cancel each other. Accordingly, the Wheatstone bridge does not output a signal, with the result that the level of an interference output is reduced.

In the semiconductor acceleration sensor of the third aspect of the invention, the weight, support member and beams are formed from one semiconductor substrate, and working widths of engraved portions for forming the weight, support member and beams and engraved from the upper and lower faces of the semiconductor substrate are identical with each other. When the substrate is subjected to an engraving process such as a plasma etching process, therefore, the etching proceeds at a constant rate, resulting in that the working accuracy is enhanced.

In the semiconductor acceleration sensor of the fourth aspect of the invention, the support member comprises a plurality of signal terminals of one side which are connected to the strain gauges formed on the upper faces of the beams, and a plurality of dummy signal terminals of one side and having the same shape as the signal terminals of one side. The signal terminals and .dummy signal terminals of one side are arranged in the periphery of the upper face of the support member at substantially equal intervals. The sensor further comprises a supporting substrate comprising a plurality of signal terminals and dummy signal terminals of the other side which are respectively opposed and connected to the signal terminals and dummy signal terminals of the one side. The supporting substrate functions to .connect the strain gauges formed on the beams to the exterior through the signal terminals of the other side. The sum of the height of the signal terminals of one side and that of the signal terminals of the other side, and the sum of the height of the dummy signal terminals of one side and that of the dummy signal terminals of the other side are set to be a dimension which is slightly greater than the displacement amount of the weight during operation. When an impact is given to the semiconductor acceleration sensor, therefore, the gas between the upper face of the weight and the lower face of the supporting substrate is compressed so as to apply a damping operation of a high frequency region, for example, 500 Hz or higher to the weight, whereby the impact resistance of the sensor is improved.

In the semiconductor acceleration sensor of fifth aspect of the invention, the sensor further comprises an additional weight and stopper disposed on the upper face of the weight and having an inverse convex shape. The outer periphery of the additional weight and stopper is greater than the inner periphery of the support member. The gap between the lower face of the outer periphery portion of the additional stopper and stopper and the upper face of the support member is set to be a dimension which is smaller-than the allowable displacement amount of the weight. Therefore, when an impact, for example, an impact of a short frequency region or several tens of Hz or lower is given to the semiconductor acceleration sensor, the deflection of the weight is suppressed within the allowable displacement amount by the additional weight and stopper.

In the semiconductor acceleration sensor of sixth aspect of the invention, the sensor further comprises a supporting substrate disposed on the lower face of the support member and has a recess which opens upward. The recess is greater than that of the weight. The gap between the face of the recess and the lower face of the weight is set to be a dimension which is slightly greater than the displacement amount of the weight during operation. When an impact is given to the semiconductor acceleration sensor, therefore, the gas between the lower face of the weight and the face of the recess of the supporting substrate is compressed so as to apply a damping operation to the weight in the same manner as the embodiment of the fourth aspect of the invention, whereby the impact resistance of the sensor is improved.

In the semiconductor acceleration sensor of the seventh aspect of the invention, the sensor further comprises upper and lower supporting substrates. The upper supporting substrate is disposed on the upper face of the support member and has a recess which opens downward. The recess is greater than that of the weight, and a plural number of downward projections are formed in the recess and at locations which face the outer periphery of the weight. The lower supporting substrate is disposed on the lower face of the support member and has a recess which opens upward. The recess is greater than that of the weight, and a plural number of upward projections are formed in the recess and at locations which face the outer periphery of the weight. The gaps between the upper and lower faces of the weight and the faces of the recesses of the upper and lower supporting substrates are set to be a dimension which is slightly greater than the displacement amount of the weight during operation. The gaps between the upper and lower faces of the weight and the projections formed in the recesses of the upper and lower supporting substrates are set to be a dimension which is smaller than the allowable displacement amount of the weight. When an impact is given to the sensor, therefore, the gas between the upper or lower face of the weight and the face of the recess of the upper supporting substrate or the face of the recess of the lower supporting substrate is compressed so as to apply a damping operation to the weight in the same manner as the embodiment of the fourth aspect of the invention, whereby the impact resistance of the sensor is improved. Moreover, the deflection of the weight is suppressed within the allowable displacement amount by the projections formed in the recess of the upper or lower supporting substrate, in the same manner as the fifth embodiment.

In the semiconductor acceleration sensor of the eighth aspect of the invention, the sensor further comprises upper and lower supporting substrates. The upper supporting substrate is disposed on the upper face of the support member and has a recess which opens downward. The recess is greater than that of the weight, and a downward projection is formed in the recess and at a location which faces the outer periphery of the weight. The lower supporting substrate is disposed on the lower face of the support member and has a recess which opens upward. The recess is greater than that of the weight, and an upward projection is formed in the recess and at a location which faces the outer periphery of the weight. The gaps between the upper and lower faces of the weight and the faces of the recesses of the upper and lower supporting substrates are set to be a dimension which is slightly greater than the displacement amount of the weight during operation. The gaps between the upper and lower faces of the weight and the projections formed in the recesses of the upper and lower supporting substrates are set to be a dimension which is smaller than the allowable displacement amount of the weight. When an impact is given to the sensor, therefore, the gas between the upper or lower face of the weight and the face of the recess of the upper supporting substrate or the face of the recess of the lower supporting substrate is compressed so as to apply a damping operation to the weight in the same manner as the fourth aspect of the invention, whereby the impact resistance of the sensor is improved. Moreover, the deflection of the weight is suppressed within the allowable displacement amount by the projection formed in the recess of the upper or lower supporting substrate, in the same manner as the fifth embodiment.

The semiconductor acceleration sensor, according to the ninth aspect of the invention, is formed of a semiconductor and includes a square thick-walled weight, a thick-walled support set a predetermined space apart from the weight and provided with an inner square opening formed in such a way as to surround the weight, four thin-walled beams for coupling four end sides on both opposed external sides of the weight to the respective opposed inner sides of the support, and strain gauges formed in the respective beams. Consequently, the weight is supported by the beams on the left and right sides when acceleration is applied in the crosswise direction (the direction of non-detection) and the bending of the beams in this case is far less than that of beams in a conventional case where the weight is supported by only those on one side. Moreover, the interference output is markedly decreased.

Further, the semiconductor acceleration sensor, according to the tenth aspect of the invention, is formed of a semiconductor and includes a weight having a square thick-walled central portion and four square thick-walled protrusions formed on the respective sides of the central portion, the sides thereof making a right angle with each other about the center of the central portion, a thick-walled support having an inner square opening set a predetermined space apart from the outer sides of the protrusions of the weight and formed in such a way as to surround the weight, four thin-walled beams for coupling the one sides of the protrusions of the weight, the sides thereof making a right angle with each other about the center of the central portion of the weight, and strain gauges formed in the respective beams. Since the beams are formed along the respective sides of the central portion of the weight in this semiconductor acceleration sensor, their lengthwise sides can be made longer and thereby the beams become readily bent.

The strain gauges formed in the four beams of either semiconductor acceleration sensor include, four strain gauges on a first side, these four strain gauges being formed in the top surfaces of the junctions between the beams and the support in the lengthwise direction of the beams respectively, and four strain gauges on a second side, these four strain gauges being formed in the top surfaces of the junctions between the beams and the weight in the lengthwise direction thereof respectively. A Wheatstone bridge is set up by making two of the strain gauges out of the four strain gauges constituting the first side strain gauge respectively face the remaining two strain gauges symmetrically about the center point of the weight and by making two of the strain gauges out of the four strain gauges constituting the second side strain gauges respectively face the remaining two strain gauges symmetrically about the center point of the weight. When crosswise (the direction of non-detection) acceleration is applied, for instance, two pairs of strain gauges on the first and second sides which are symmetrical about the center point of the weight give the following results: when compressive stress is applied to one of the strain gauges, tensile stress is applied to the other and no signals are output from the Wheatstone bridge as the resistance changes are mutually offset. When vertical (direction of detection) acceleration is applied, moreover, all the strain gauges on the first and second sides give the following results: when compressive stress is applied to one of the strain gauges, tensile stress is applied to the other and detection signals are output from the Wheatstone bridge as the resistances of all strain gauges change. Therefore, the interference output lowers, whereas detection sensitivity increases.

Furthermore, passivation films are provided on the surfaces of the respective beams with the strain gauges formed therein in a semiconductor acceleration sensor described above, in which the strain gauges are formed in the top surfaces of the junctions between the beams and the support, and in the top surfaces of the junction between the beams and the weight in the lengthwise direction of the beams. Even though stress is produced on the surface of the silicon semiconductor because of the difference in thermal expansion coefficient between the passivation film and the silicon semiconductor, the strain gauges in the top surfaces of the beams in the lengthwise direction produce the same resistance change and when they are connected to the Wheatstone bridge, the resistance changes are mutually offset with the effect of causing no offset output to be generated.

Each of these semiconductor acceleration sensors described above has a configuration by which the impact resistance of the sensor is improved, and can be accommodated in a hermetically sealed container which contains an inert gas instead of a conventional hermetically sealed container which contains a damping liquid.

DETAILED DESCRIPTION OF THE PREFERRED EMBODIMENTS

First Embodiment

Figure 1A:
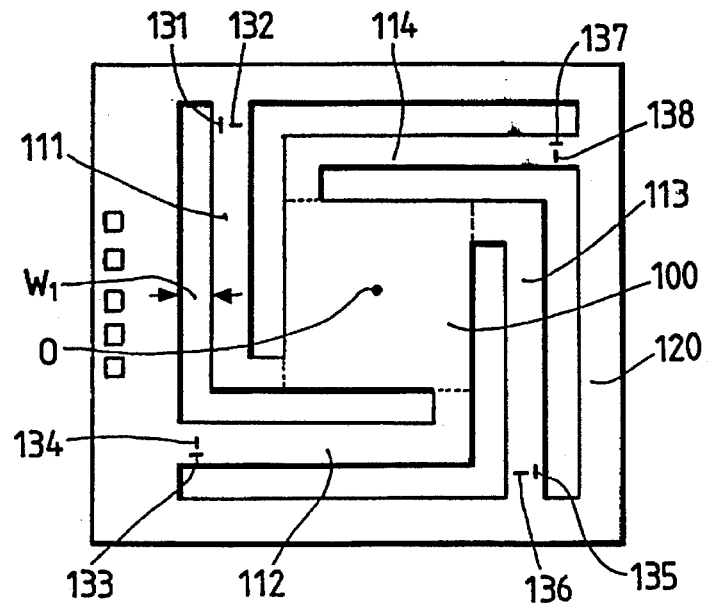
FIGS. 1A to 1C show a first embodiment of the semiconductor acceleration sensor of the invention.
Figure 1B:
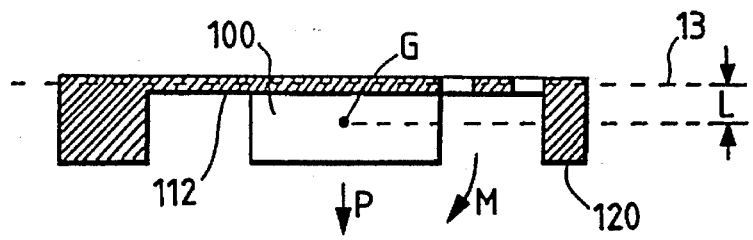
Figure 1C:
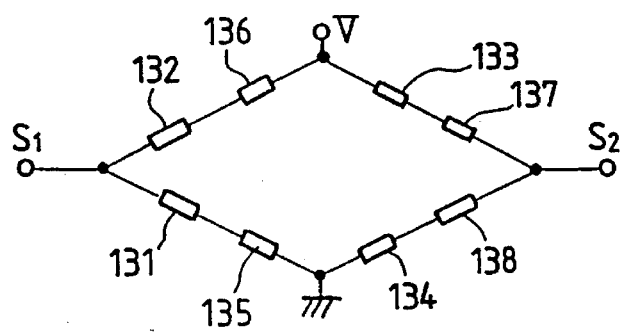

FIG. 1 shows a first embodiment of the semiconductor acceleration sensor of the invention. FIG. 1A is a plan view, FIG. 1B is a sectional view and FIG. 1C is a circuit diagram. In FIGS. 1A and 1B, the semiconductor acceleration sensor comprises a quadrangular prism-like thick weight 100 made of a semiconductor and having a thickness of, for example, 400 microns, a thick support member 120 which is separated by a predetermined gap from the weight 100 and formed so as to surround it, first and second sets of L-like thin beams which connect the outer periphery of the weight 100 with the inner periphery of the support member 120 and which have a thickness of, for example, 10 to 40 microns. The first and second sets consist of a pair of beams 111 and 113 and a pair of beams 112 and 114, respectively. In each of the beam sets, the two beams are positioned so that, when one of them is rotated by 180 degree about the center O of the weight 100, this beam coincides with the other beam. Strain gauges 131 to 138 are formed on the upper faces of the beams.

In the semiconductor acceleration sensor, the weight is supported at two opposite ends by a pair of beams. When acceleration in the transverse direction (which is the direction of not detecting acceleration) is applied to the weight, therefore, the deflection of the beams is much smaller than that in a sensor wherein the weight is supported at only one end, so that the level of an interference output is reduced and the durability is improved.

The strain gauges 131 to 138 formed on the upper faces of the beams 111 to 114 are classified into the strain gauges 131, 133, 135 and 137 of a first type which are respectively formed on the upper faces of these beams in the side of connecting the beams with the support member 120 and in the longitudinal direction of the respective beam, and the strain gauges 132, 134, 136 and 138 of a second type which are formed in the width direction of the respective beam. These strain gauges 131 to 138 are electrically connected as shown in FIG. 1C to constitute a Wheatstone bridge in which the strain gauges 131 and 135 of the first type respectively formed on the first set of beams 111 and 113 are opposed to the strain gauges 133 and 137 of the first type respectively formed on the second set of thin beams 112 and 114, and the strain gauges 132 and 136 of the second type respectively formed on the first set of beams 111 and 113 are opposed to the strain gauges 134 and 138 of the second type respectively formed on the second set of beams 112 and 114. In FIG. 1C, V designates a power supply terminal, and $S_1$ and $S_2$ designate signal output terminals.

When acceleration in the vertical direction (which is the direction of detecting acceleration) is applied to the weight 100, the weight 100 is subjected to a force in the vertical direction and the beams 111, 112, 113 and 114 deflect in the direction indicated by arrow P. At this time, tensile stresses act on the upper faces of the beams in the side of connecting them with the support member 120, so that the resistance of each of the strain gauges 131, 133, 135 and 137 of the first type which are formed in the longitudinal direction of the respective beam increases. In contrast, the resistance of each of the strain gauges 132, 134, 136 and 138 of a second type which are formed in the width direction of the respective beam does not change. This causes a detection signal the level of which is proportional to the magnitude of the acceleration, to be output from the signal output terminals $S_1$ and $S_2$ of the Wheatstone bridge.

In this embodiment, the deflection center line 13 of each beam is separated by a distance L from the center of gravity G of the weight 100. When acceleration in the transverse direction (which is the direction of not detecting acceleration) is applied to the weight 100, therefore, a moment M generated by the distance L is applied to the weight 100 so as to generate a compressive stress acting on the upper face of one of the paired beams 112 and 114 (for example, the beam 112). At this time, a tensile stress acts on the upper face of the other beam 114. In the Wheatstone bridge, therefore, the resistance of each of the strain gauges 133 and 137 of the first type respectively formed on these beams changes in such a manner that the changes in resistance cancel each other. Accordingly, the Wheatstone bridge does not output a signal, with the result that the level of an interference output is reduced.

In the embodiment of FIG. 1A, the thick weight 100 is quadrangular in a plan view. The weight 100 is not restricted to having a quadrangular shape, and may have another shape, for example, a circular shape. Although a sensor comprising the thin beams of an L-like shape has been described in the above, moreover, the beams are not restricted to having an L-like shape, and may have another shape, for example, an I-like shape or rectangular shape.

Second Embodiment

Figure 2A:
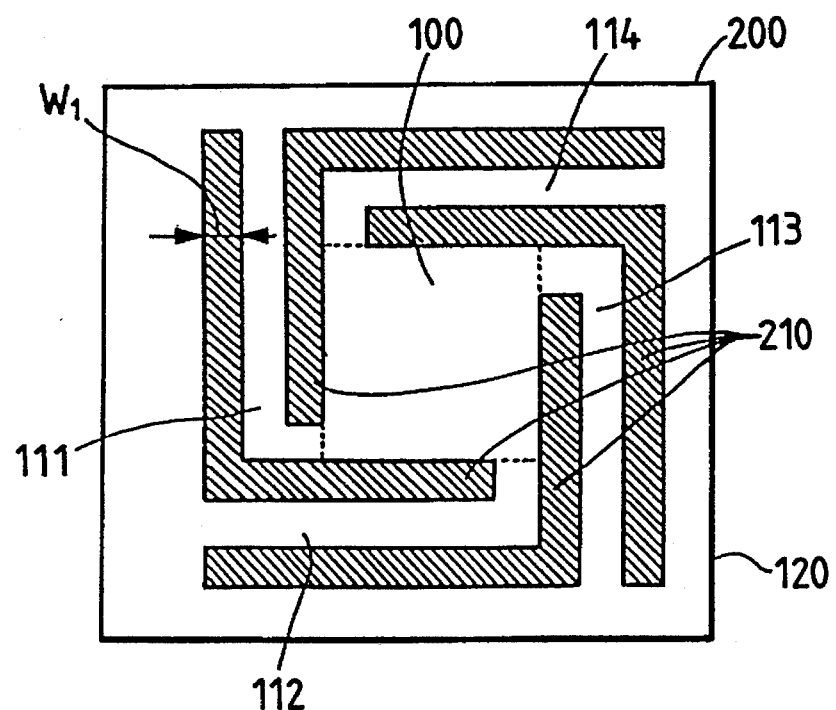
FIGS. 2A and 2B show a method of processing a semiconductor substrate in a second embodiment of the semiconductor acceleration sensor of the invention.
Figure 2B:
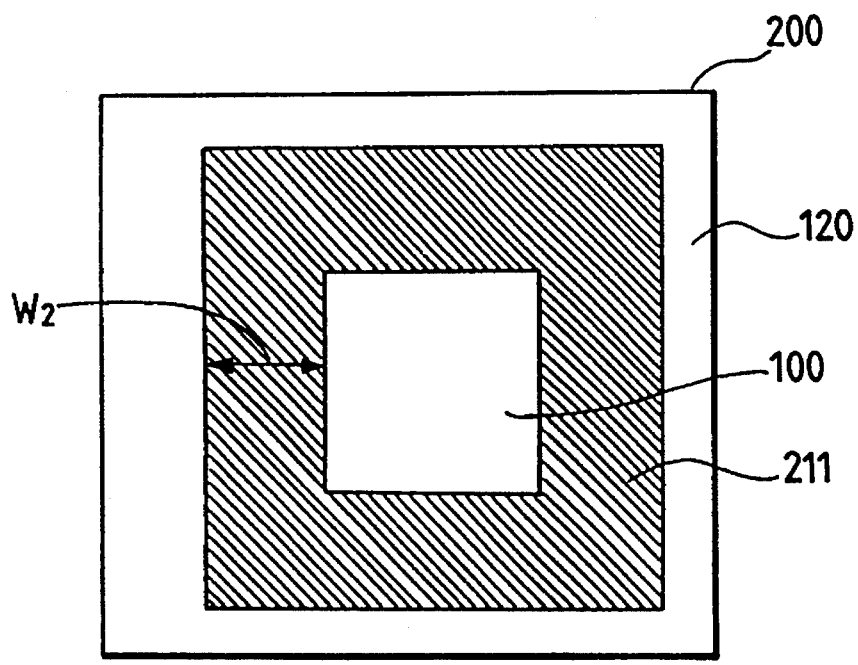

A second embodiment of the semiconductor acceleration sensor of the invention will be described with reference to FIGS. 2A and 2B showing a method of forming a weight, a support member and beams from a semiconductor substrate. FIG. 2A is a plan view of the semiconductor substrate and FIG. 2B is a bottom view of the semiconductor substrate.

In the method shown in FIG. 2, a semiconductor substrate 200, a weight 100, a support member 120, and beams 111, 112, 113 and 114 are formed as follows. First, as shown in FIG. 2A, portions which are hatched and labeled by 210 are engraved by, for example, a plasma etching process, from the upper face of the semiconductor substrate to a depth equal to or greater than the thickness of the weight 100. Thereafter, portions which are hatched and labeled by 211 in FIG. 2B are engraved so as to form the beams 111, 112, 113 and 114 having a thickness of, for example, 10 to 40 microns.

In the invention, each of the working widths $W_1$ and $W_2$ of the engraved portions 210 and 211 which are respectively engraved from the upper and lower faces of the semiconductor substrate is constant along the entire length. Therefore, the etching proceeds at a constant rate, resulting in that the working accuracy is enhanced.

Third Embodiment

Figure 3A:
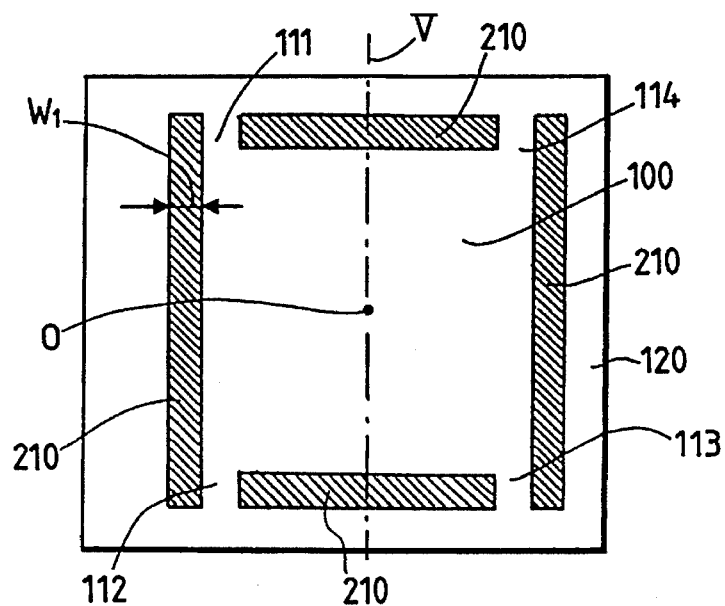
FIGS. 3A and 3B show a method of processing a semiconductor substrate in a third embodiment of the semiconductor acceleration sensor of the invention.
Figure 3B:
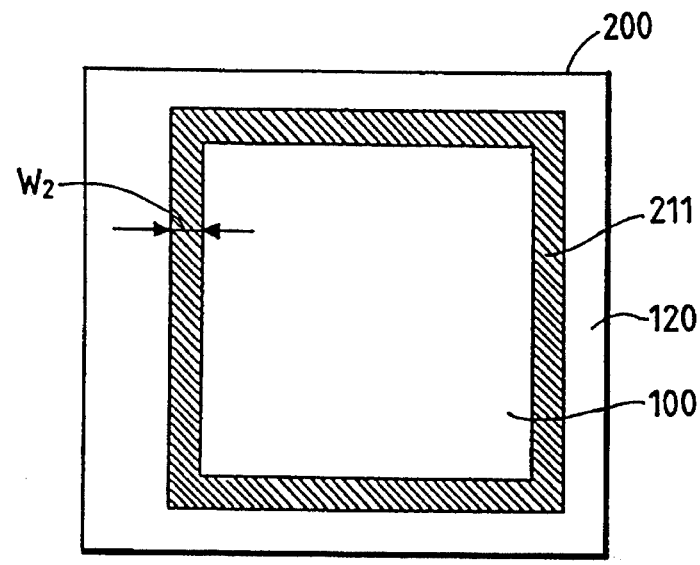

FIGS. 3A and 3B show a third embodiment of the semiconductor acceleration sensor of the invention. The embodiment of FIGS. 3A and 3B is configured in the same manner as that of FIG. 2 except that thin beams 111, 112, 113 and 114 having an I-like shape or rectangular shape are provided in place of the L-like beams used in the embodiment of FIG. 2, and that these beams are arranged in such a manner that, when the beams 111 and 112 are rotated by 180 degree about the center O of a weight 100, these beams respectively coincide with the beams 113 and 114, and the beams 111 and 112 are respectively symmetrical with the beams 114 and 113 about the longitudinal axis V of the weight 100.

Fourth Embodiment

Figure 4:
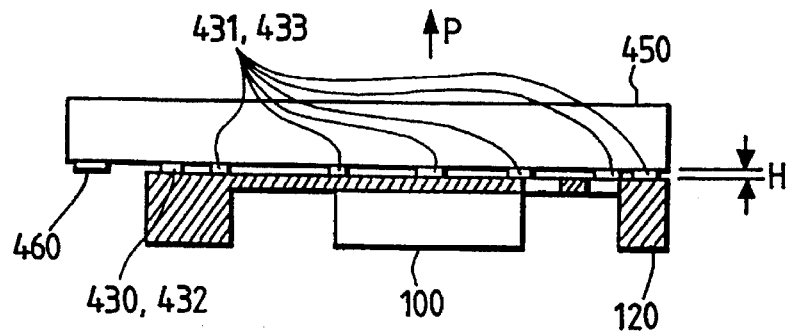
FIG. 4 is a sectional view showing a fourth embodiment of the semiconductor acceleration sensor of the invention.
Figure 5A:
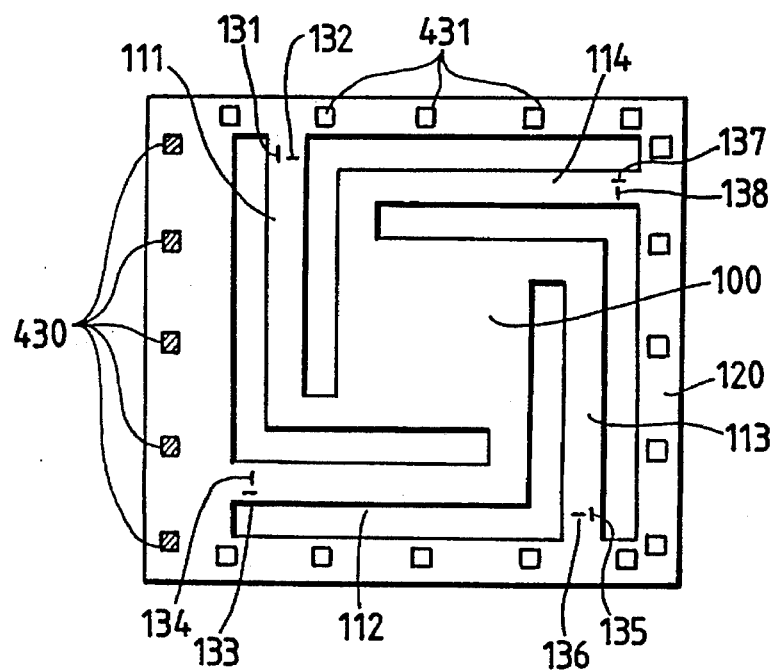
FIGS. 5A and 5B illustrate the sensor of FIG. 4 in more detail.
Figure 5B:
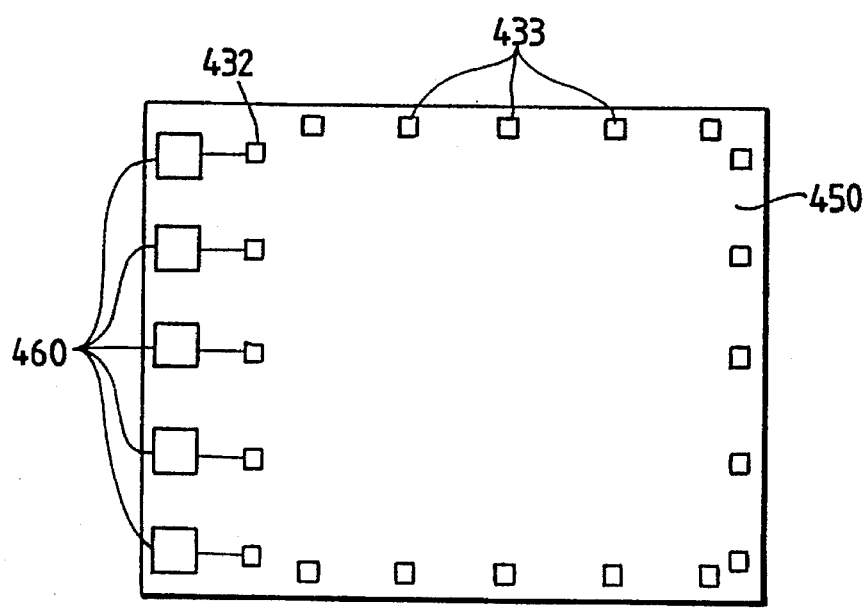

FIGS. 4 and 5 show a fourth embodiment of the semiconductor acceleration sensor of the invention. FIG. 4 is a sectional view, and FIG. 5 illustrates the sensor of FIG. 4 in more detail. FIG. 5A is a plan view of a sensor portion comprising a weight 100, a support member 120, and beams 111 to 114, and FIG. 5B is a bottom view of a supporting substrate 450. In the embodiment of FIGS. 4 and 5, a plurality of signal terminals 430 of one side which are connected to strain gauges formed on the upper faces of the beams, and a plurality of dummy signal terminals 431 of one side and having the same shape as the signal terminals 430 are arranged in the periphery of the upper face of the support member 120 at substantially equal intervals. The supporting substrate 450 is provided with a plurality of signal terminals 432 and dummy signal terminals 433 of the other side which are respectively opposed to the plural signal terminals 430 and dummy signal terminals 431 of the one side and which are to be connected thereto. The strain gauges formed on the beams are connected to an external unit, through the signal terminals 432 of the other side and connecting terminals 460 coupled to the signal terminals. The sum of the height of the signal terminals 430 of the one side and that of the signal terminals 432 of the other side, and the sum of the height of the dummy signal terminals 431 of the one side and that of the dummy signal terminals 433 of the other side are set to be a dimension $H_1$ which is slightly greater (for example, by 10 to 30 microns) than the displacement amount of the weight 100 during operation.

When an impact is given to the semiconductor acceleration sensor, the gas between the upper face of the weight 100 and the lower face of the supporting substrate 450 is compressed so as to apply a damping operation of a high frequency region, for example, 500 Hz or higher to the weight 100, whereby the impact resistance of the sensor is improved.

It is convenient to form the signal terminals 430 and 432 and dummy signal terminals 431 and 433 of the one side and other side, by a thick film of a metal or alloy such as Au, Ag or Pb/Sn.

Fifth Embodiment

Figure 6A:
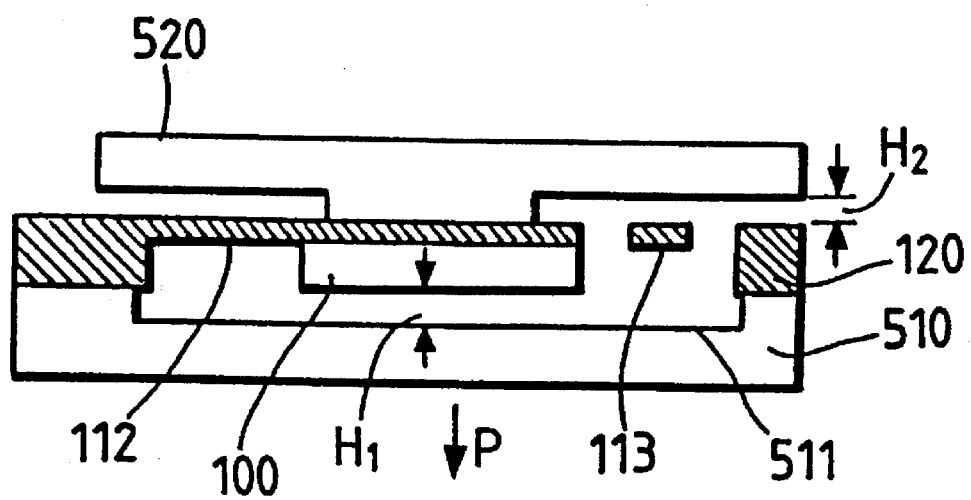
FIGS. 6A and 6B show fifth and sixth embodiments of the semiconductor acceleration sensor of the invention.
Figure 6B:
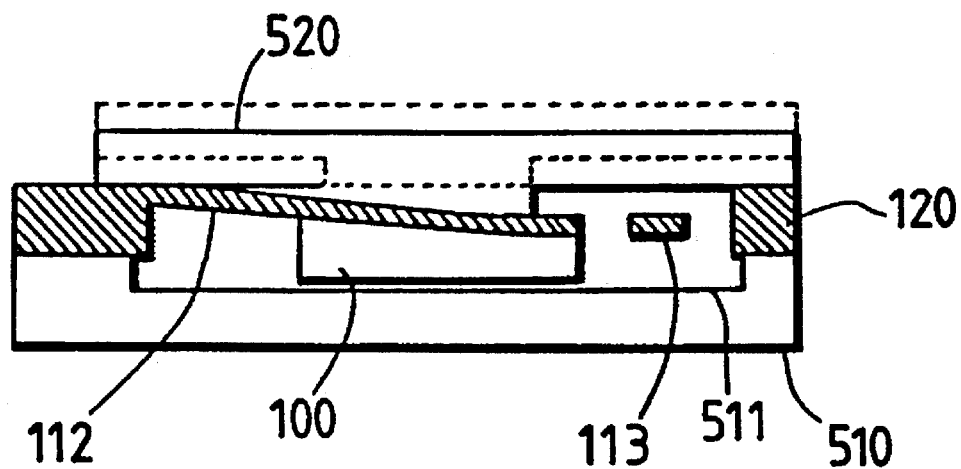

FIGS. 6A and 6B show a fifth embodiment of the semiconductor acceleration sensor of the invention. FIG. 6A is a sectional view of the semiconductor acceleration sensor and 6B is a sectional view illustrating the case where an impact is given to the sensor of FIG. 6A. In FIG. 6A, an additional weight and stopper 520 having an inverse convex shape is disposed on the upper face of a weight 100. The outer periphery of the additional weight and stopper 520 is greater than the inner periphery of a support member 120. The gap $H_2$ between the lower face of the outer periphery portion of the additional weight and stopper 520 and the upper face of the support member 120 is set to be a dimension which is smaller than the allowable displacement amount of the weight 100.

When an impact, for example, an impact of a low frequency region or several tens of Hz or lower is given to the semiconductor acceleration sensor, the deflection of the weight 100 is suppressed within the allowable displacement amount by the additional weight and stopper 520 as shown in FIG. 6B. The provision of the additional weight and stopper 520 increases the weight of the weight. This contributes to the improvement of the sensitivity of the sensor.

Sixth Embodiment

FIGS. 6A and 6B show also a sixth embodiment of the semiconductor acceleration sensor of the invention. In FIG. 6A, a supporting substrate 510 having a recess 511 which opens upward is disposed on the lower face of the support member 120. The recess 511 is greater than the outer periphery of the weight 100. The gap $H_1$ between the face of the recess 511 and the lower face of the weight 100 is set to be a dimension which is slightly greater (for example, by 10 to 30 microns) than the movable displacement amount of the weight 100 during operation.

When an impact is given to the semiconductor acceleration sensor, the gas between the lower face of the weight 100 and the face of the recess 511 of the supporting substrate 510 is compressed so as to apply a damping operation to the weight 100 in the same manner as the embodiment of FIG. 4, whereby the impact resistance of the sensor is improved.

Seventh Embodiment

Figure 7:
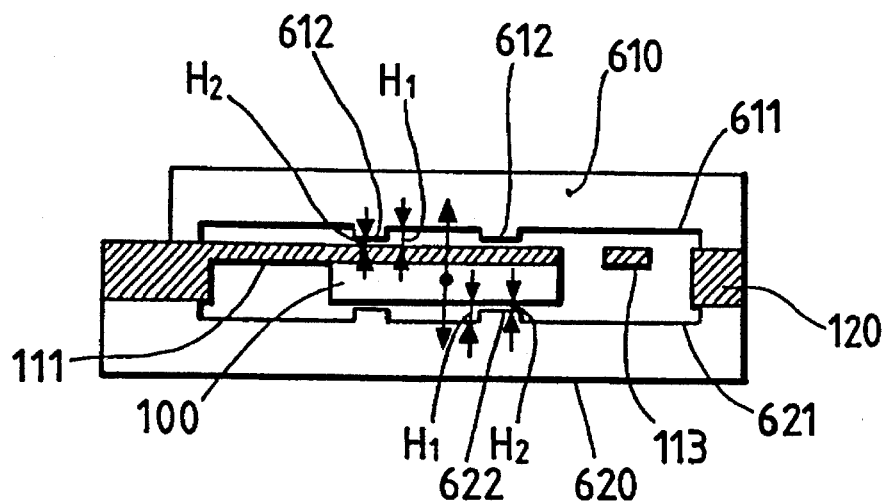
FIG. 7 is a sectional view showing a seventh embodiment of the semiconductor acceleration sensor of the invention.
Figure 8A:
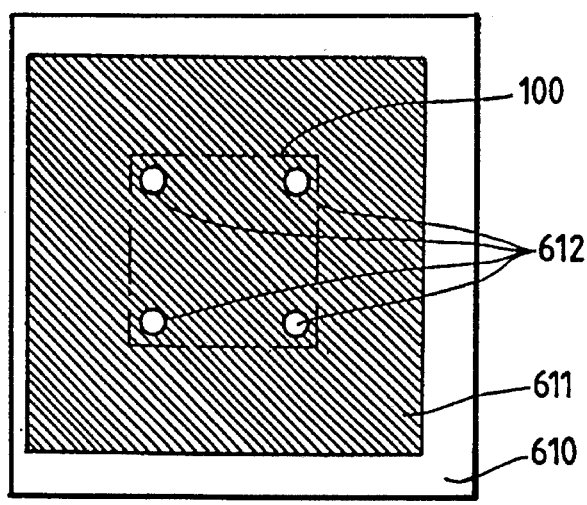
FIGS. 8A to 8C illustrate the sensor of FIG. 7 in more detail.
Figure 8B:
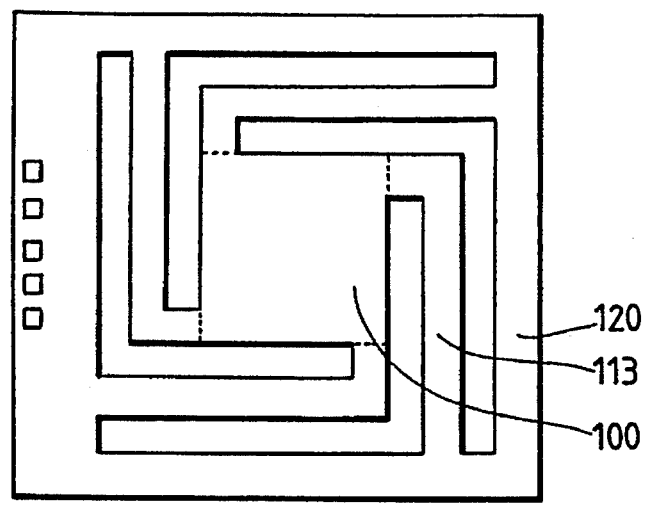
Figure 8C:
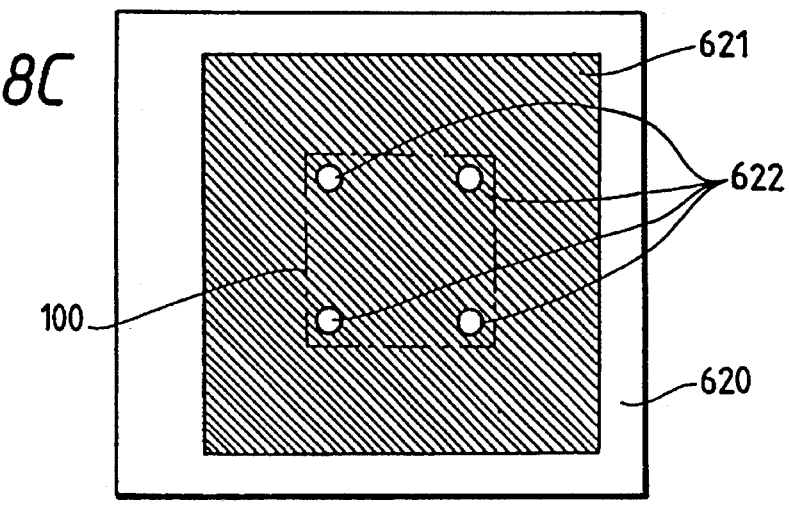

FIGS. 7 and 8A to 8C show a seventh embodiment of the semiconductor acceleration sensor of the invention. FIG. 7 is a sectional view, and FIGS. 8A to 8C illustrate the sensor of FIG. 7 in more detail. FIG. 8A is a bottom view of an upper supporting substrate 610, 8B is a plan view of a sensor portion comprising a weight 100, a support member 120 and beams 111 to 114, and 8C is a plan view of a lower supporting substrate 620. In FIGS. 7 and 8, the upper supporting substrate 610 and the lower supporting substrate 620 are disposed on the upper and lower faces of the support member 120, respectively. The upper supporting substrate 610 has a recess 611 which opens downward. The recess 611 is greater than the outer periphery of the weight 100. In the recess 611, a plural number (e.g., 4) of downward projections 612 are formed at locations facing the outer periphery of the weight 100. The lower supporting substrate 620 has a recess 621 which opens upward. The recess 621 is greater than the outer periphery of the weight 100. In the recess 621, a plural number (e.g., 4) of upward projections 622 are formed at locations facing the outer periphery of the weight 100. The gaps between the upper and lower faces of the weight 100 and the faces of the recesses 611 and 621 of the upper and lower supporting substrates 610 and 620 are set to be a dimension $H_1$ which is slightly greater (for example, by 10 to 40 microns) than the movable displacement amount of the weight 100 during operation. The gaps between the upper and lower faces of the weight 100 and the projections 612 and 622 formed in the recesses 611 and 621 of the upper and lower supporting substrates 610 and 620 are set to be a dimension $H_2$ which is smaller than the allowable displacement amount of the weight 100.

When an impact is given to the semiconductor acceleration sensor, the gas between the upper or lower face of the weight 100 and the face of the recess 611 of the upper supporting substrate 610 or the face of the recess 621 of the lower supporting substrate 620 is compressed so as to apply a damping operation to the weight 100 in the same manner as the fourth embodiment of FIGS. 4 and 5, whereby the impact resistance of the sensor is improved. Moreover, the deflection of the weight 100 is suppressed within the allowable displacement amount by the projections 612 or 613 formed in the recess 611 or 621 of the upper or lower supporting substrate 610 or 620, in the same manner as the fifth embodiment of FIG. 6.

Eighth Embodiment

Figure 9:
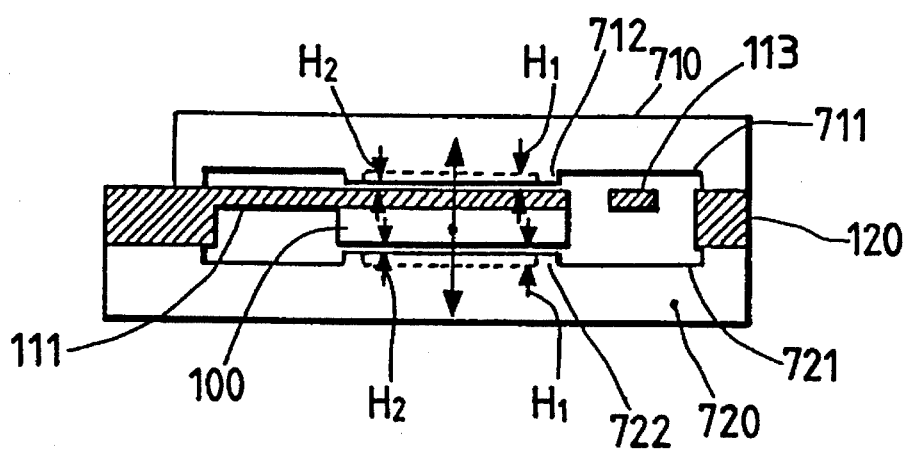
FIG. 9 is a sectional view showing an eighth embodiment of the semiconductor acceleration sensor of the invention.
Figure 10A:
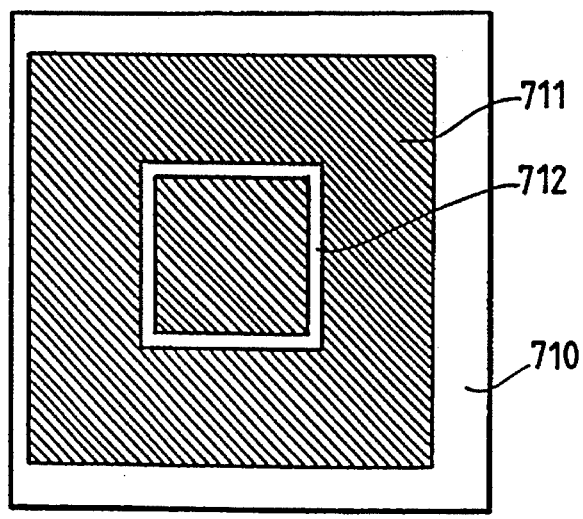
FIGS. 10A to 10C illustrate the sensor of FIG. 9 in more detail.
Figure 10B:
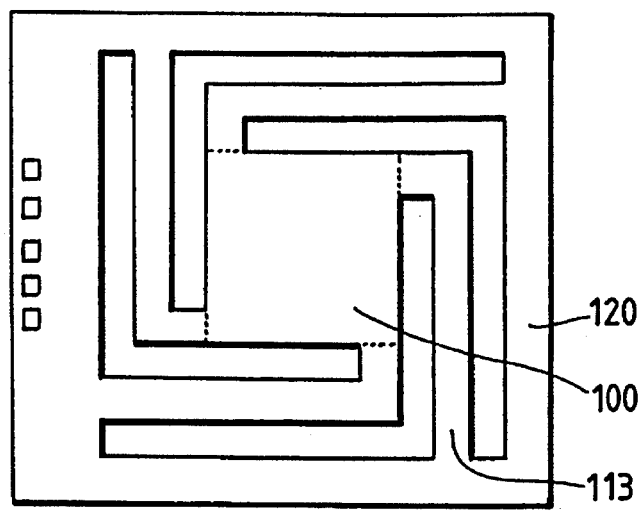
Figure 10C:
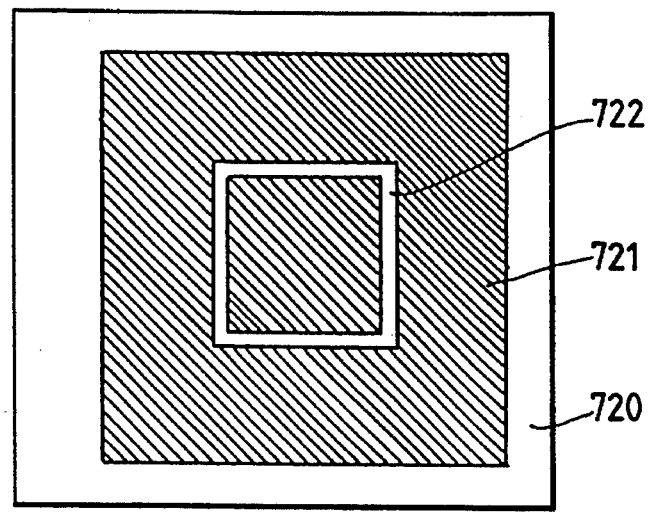

FIGS. 9 and 10A to 10C show an eighth embodiment of the semiconductor acceleration sensor of the invention. FIG. 9 is a sectional view, and FIGS. 10A to 10C illustrate the sensor of FIG. 9 in more detail. FIG. 10A is a bottom view of an upper supporting substrate 710, FIG. 10B is a plan view of a sensor portion comprising a weight 100, a support member 120 and beams 111 to 1114, and FIG. 10C is a plan view of a lower supporting substrate 720. Recesses 711 and 721 are similar to recesses 611 and 621 of FIG. 7.

The configuration and operation of the eighth embodiment shown in FIGS. 9 and 10 are the same as those of the seventh embodiment shown in FIGS. 7 and 8, except that projections 712 and 722 are disposed at locations facing the outer periphery of the weight 100, in place of the plural number (e.g., 4) of projections 612 and 622 shown in FIGS. 7 and 8 and formed at locations facing the outer periphery of the weight 100. The projections 712 and 722 elongate along the outer periphery of the weight 100.

Figure 11:
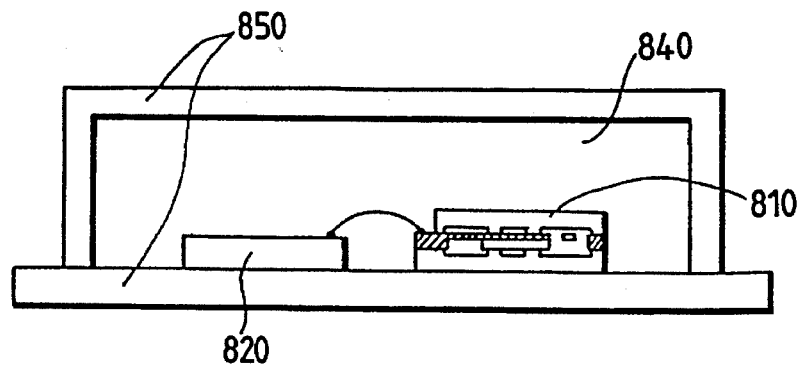
FIG. 11 is a sectional view showing the case that one of the semiconductor acceleration sensors of the first to eighth embodiments is accommodated in a hermetically sealed container which contains an inert gas.
Figure 12A:
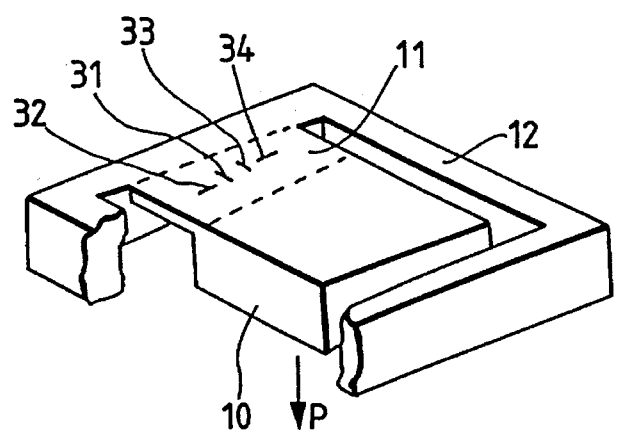
FIGS. 12A and 12B show a conventional semiconductor acceleration sensor.
Figure 12B:
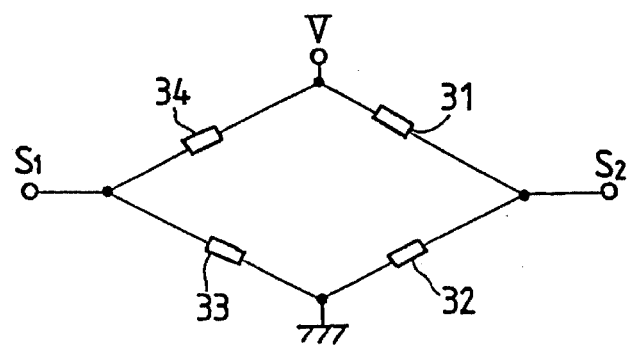
Figure 13:
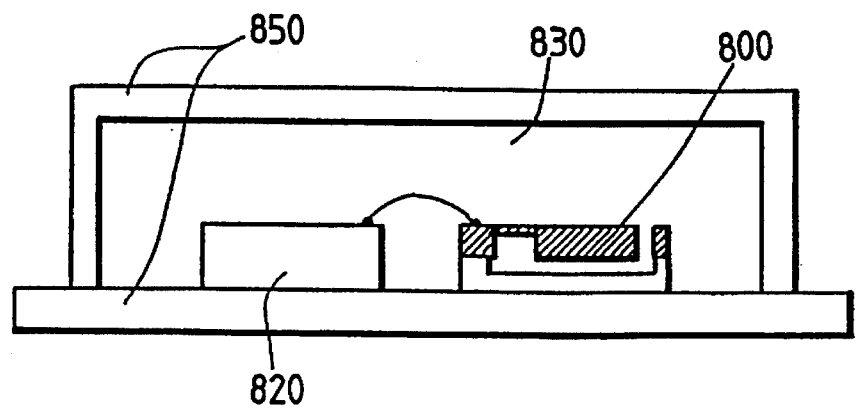
FIG. 13 is a sectional view showing the conventional semiconductor acceleration sensor of FIG. 12 which is accommodated in a hermetically sealed container containing a damping liquid.
Figure 14:
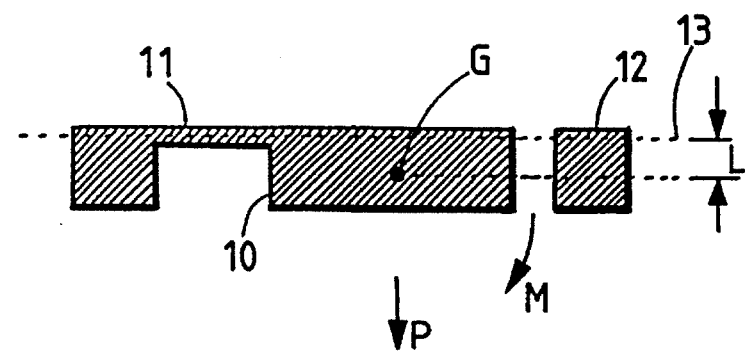
FIG. 14 is a sectional view showing the mechanism by which an interference output is generated in the conventional semiconductor acceleration sensor of FIG. 12.
Figure 15:
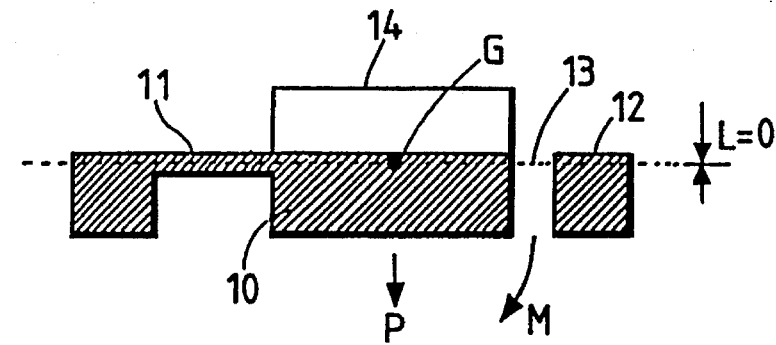
FIG. 15 is a sectional view showing another conventional semiconductor acceleration sensor.
Figure 16:
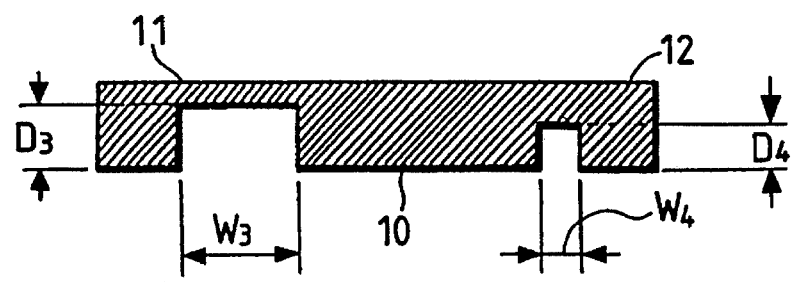
FIG. 16 is a sectional view illustrating a method of processing a semiconductor substrate used in the conventional semiconductor acceleration sensor of FIG. 12 or 14.

As shown in FIG. 11, each of the semiconductor acceleration sensors described above is accommodated as required in a hermetically sealed container 850 which contains an inert gas 840. This arrangement allows the sensors to be used sufficiently safely under severe environmental conditions for sensors for automobiles. In FIG. 11, 810 designates one of the semiconductor acceleration sensors, and 820 designates an amplifier for a detection signal.

Figure 17A:
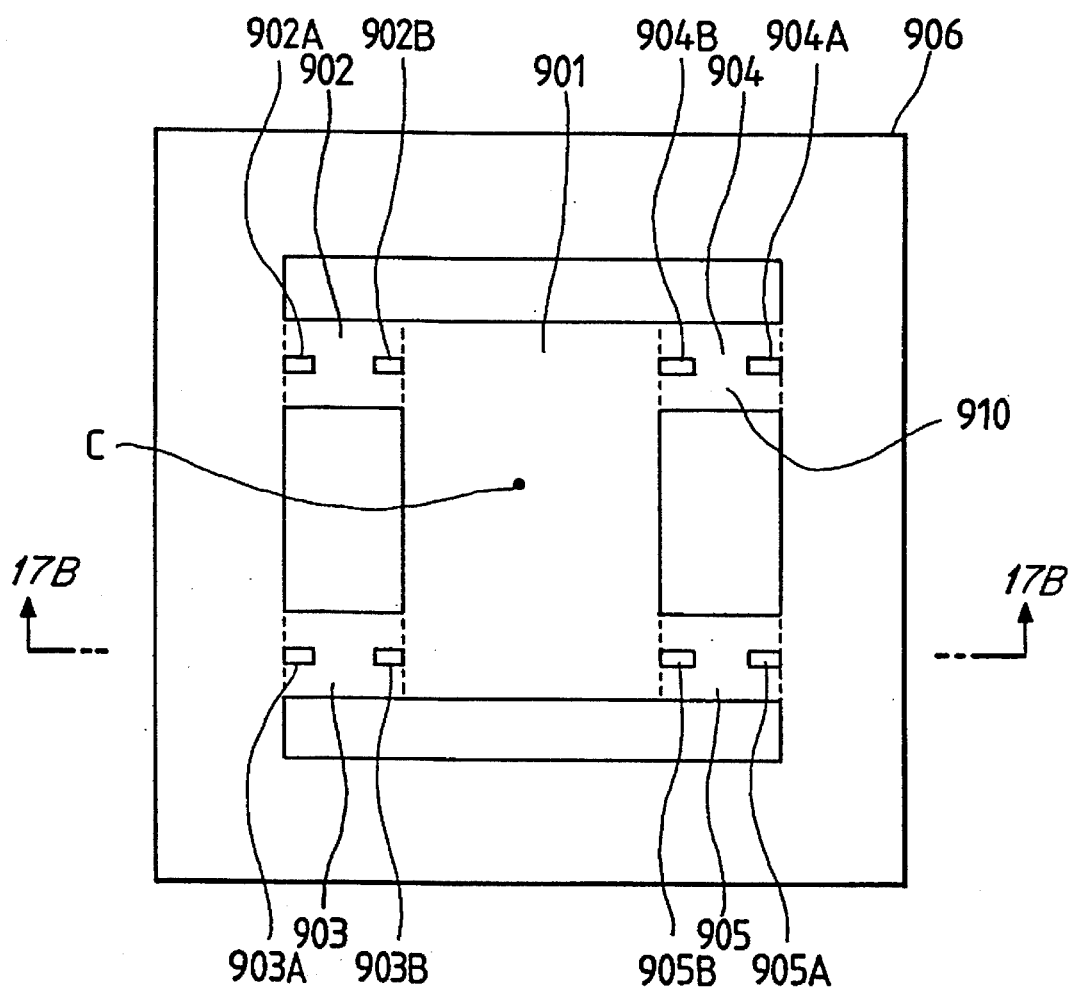
FIG. 17A is a top view of a semiconductor acceleration sensor of the ninth embodiment of the present invention.
Figure 17B:
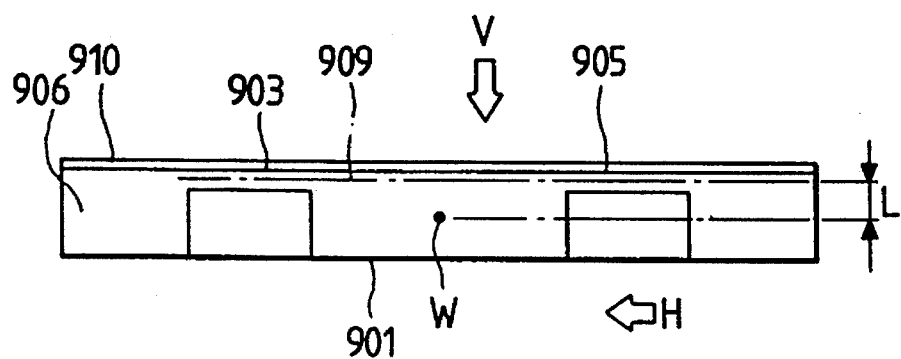
FIG. 17B is a sectional view taken on line 17B—17B of FIG. 17A.
Figure 19:
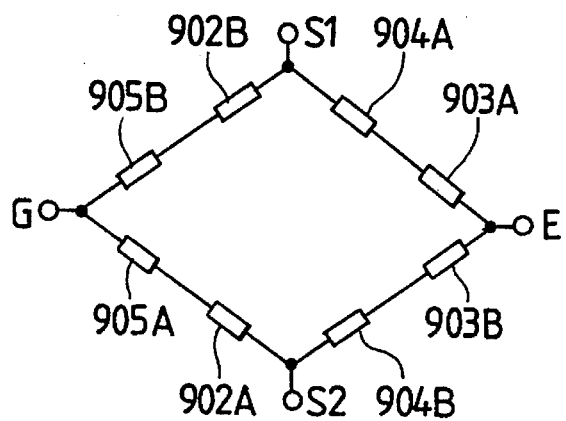
FIG. 19 is a connection diagram of the semiconductor acceleration sensor of FIG. 17A.

FIGS. 17A and 17B illustrate a semiconductor acceleration sensor embodying the present invention: FIG. 17A is a top view and FIG. 17B a sectional view taken on line A—A of FIG. 17A. As shown in FIGS. 17A and 17B, the semiconductor acceleration sensor is formed of a semiconductor and includes a square thick-walled weight 901 which is, for example, 400 microns thick, a thick-walled support 906 having an inner square opening set a predetermined space apart from the weight 901 and formed in such a way as to surround the weight 901, four thin-walled beams 902, 903, 904, 905, which are, for example, 20 to 40 microns thick, for coupling four end sides on both opposed external sides of the weight 901 to the respective opposed inner sides of the support 906, and strain gauges 902A, 902B, 903A, 903B, 904A, 904B, 905A, 905B formed in the respective beams 902, 903, 904, 905. The strain gauges 902A, 903A, 904A, 905A among all these gauges are formed in the top surfaces of the junctions between the support 906 and the beams 902, 903, 904, 905 with the gauges beams, in the lengthwise direction of the beams, respectively. On the other hand, the strain gauges 902B, 903A, 904B, 905B are formed in the top surfaces of the junctions between the weight 901 and the beams 902, 903, 904, 905 with the gauges in the lengthwise direction of the beams, respectively. Assuming that the strain gauges 902A, 903A, 904A, 905A formed in the top surfaces of the respective junctions between the beams and the support are called a first side strain gauge and the strain gauges 902B, 903B, 904B, 905B formed in the top surfaces of the respective junctions between the beams and the weight are called a second side strain gauge, a Wheatstone bridge of FIG. 19 can be set up by making two of the respectively face the strain gauges 903A, 904A symmetrically about the center point C of the weight 901 and by making two of the strain gauges 902B, 905B out of the four strain gauges constituting the second side strain gauge respectively face the strain gauges 903B, 904B symmetrically about the center point C of the weight 901. In this case, V denotes a power supply terminal, G a ground terminal, and S1, S2 signal output terminals.

Figure 20:
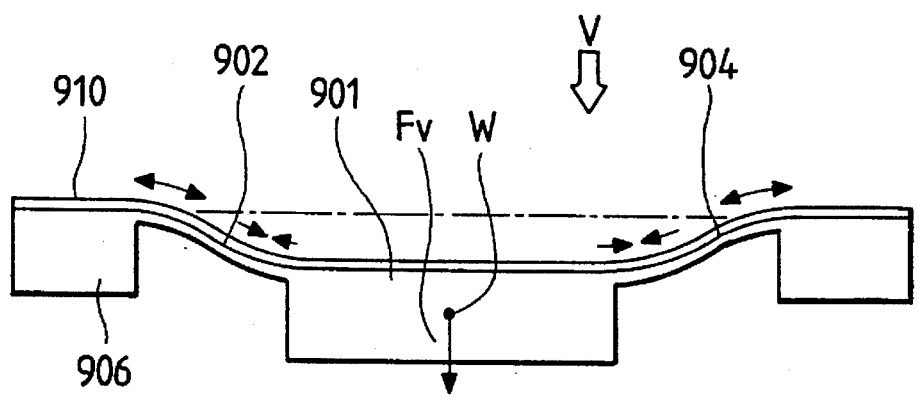
FIG. 20 is a sectional view illustrating the operation of the semiconductor acceleration sensor of FIG. 17A.

When acceleration is applied to the weight 901 in direction of arrow V in FIG. 17B, that is, in a direction perpendicular to the weight 901 (the direction in which the acceleration is detected), the weight 901 receives vertical force Fv, moves downward as shown in FIG. 20 and is supported by the beams 902, 903 and 904, 905 on both sides. At this time, tensile stress acts on the top surfaces of the junctions between the beams and the support 906, whereas compressive stress acts on the top surfaces of the junctions between the beams and the weight 901. Then the resistances of the strain gauges 902A, 903A, 904A, 905A on the first side increase and the resistances of the strain gauges 902B, 903B, 904B, 905B on the second side decrease. Detection signals whose strength is proportional to the acceleration are output from the output terminals S1, S2 of the Wheatstone bridge accordingly.

Figure 21:
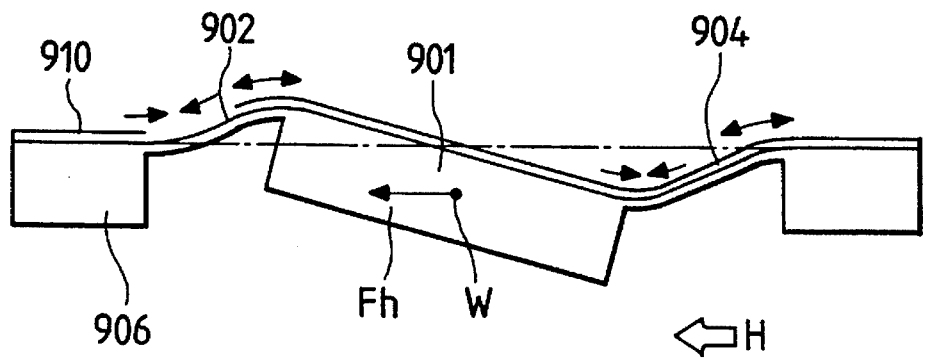
FIG. 21 is a sectional view further illustrating the operation of the semiconductor acceleration sensor of FIG. 17A.
Figure 22:
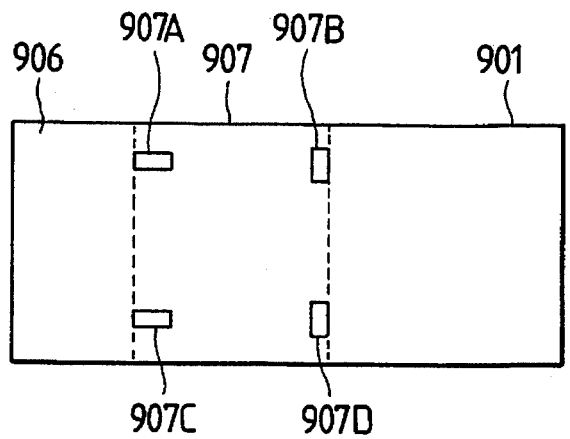
FIG. 22 is a top view of a conventional semiconductor acceleration sensor shown by way of example.
Figure 23:
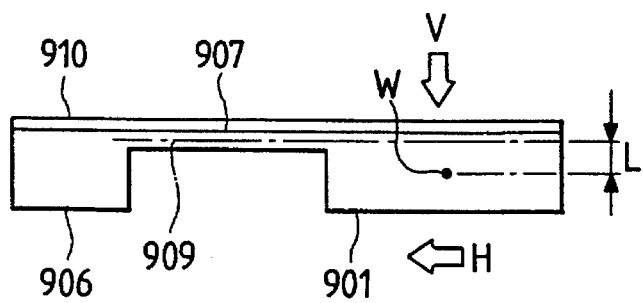
FIG. 23 is a side view of FIG. 22.
Figure 24:
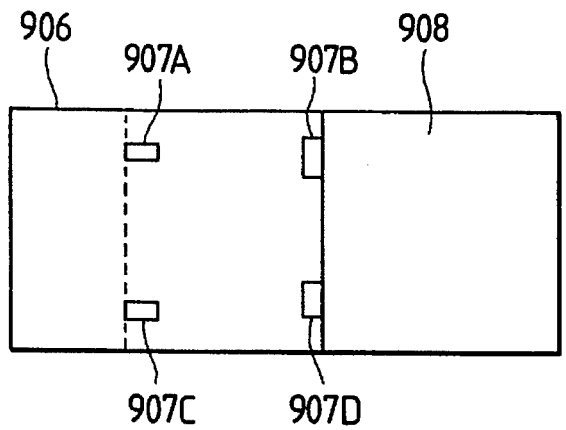
FIG. 24 is a top view of another conventional semiconductor acceleration sensor.
Figure 25:
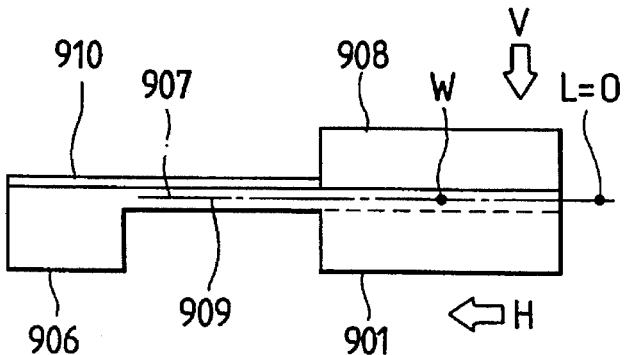
FIG. 25 is a side view of FIG. 24.
Figure 26:
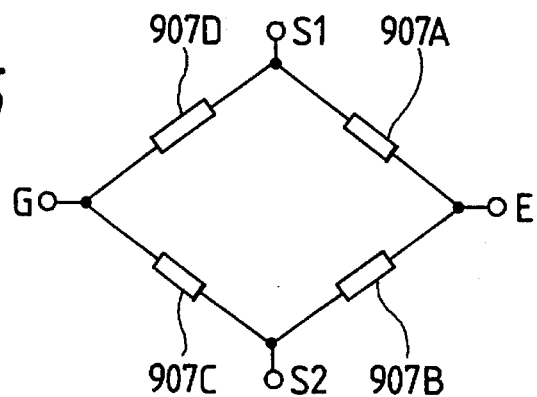
FIG. 26 is a connection diagram of the conventional semiconductor acceleration sensor of FIG. 22.
Figure 27:
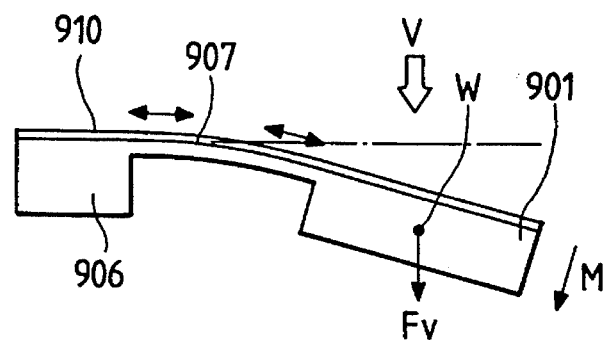
FIG. 27 is a side view illustrating the operation of the conventional semiconductor acceleration sensor of FIG. 22.
Figure 28:
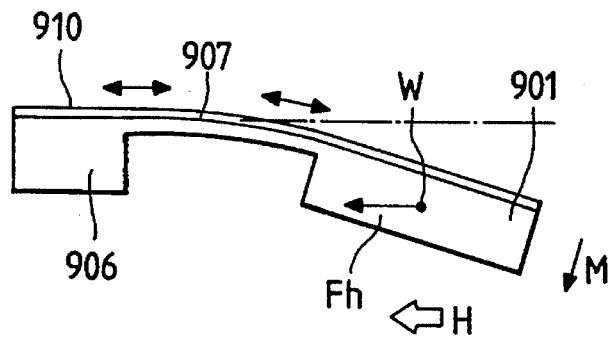
FIG. 28 is a side view further illustrating the operation of the conventional semiconductor acceleration sensor of FIG. 22.
Figure 29:
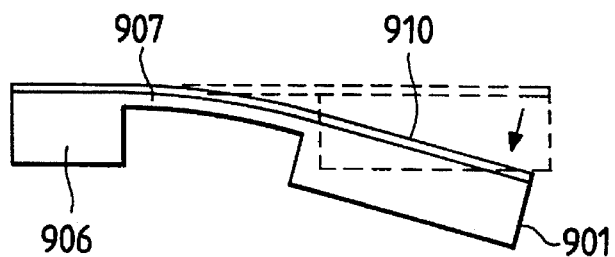
FIG. 29 is a side view still further illustrating the operation of the conventional semiconductor acceleration sensor of FIG. 22.

When acceleration is subsequently applied to the weight 901 in direction of arrow H in FIG. 17B, that is, in the crosswise direction (the direction in which the acceleration is non-detected), a moment resulting from a distance L from the strain centerline 909 of the beam to the center of gravity W of the weight 901 and the crosswise force Fh produced in the weight 901 because of the acceleration cause deformation as shown in FIG. 21. With respect to the beams 902, 903 on the side pushed by the weight 901, compressive stress acts on the top surface of the junction between each beam and the support, and tensile stress acts on the top surface of the junction between each beam and the weight. With respect to the beams 904, 905 on the side pulled by the weight 901, tensile stress acts on the top surface of the junction between each beam and the support, and compressive stress acts on the top surface of the junction between each beam and the weight.

Therefore, the two pairs of strain gauges 902A, 905A and 903A, 904A which are symmetrical about the center point C of the weight 901 among the four strain gauges 902A, 903A, 904A, 5A on the first side give the following results: the resistance of 902A decreases and that of 905A increases so that the resistance changes are offset; and the resistance of 903A decreases and that of 904A increases so that the resistance changes are also offset. This is also the case with the strain gauges 902B, 903B, 904B, 905B on the second side and the resistance changes are offset. In other words, no signal is output from the Wheatstone bridge.

Since the weight 901 of this semiconductor acceleration sensor is supported by the beams 902, 903 and 904, 905 on both sides, the weight is supported by the beams on the left and right sides when acceleration is applied in the crosswise direction (the direction of non-detection). Therefore, the bending of the beams in this case is less than that of beams in a conventional case where the weight is supported by only those on one side. Moreover, the interference output is markedly decreased as the strain gauges mutually offset the resistance changes as previously noted.

When acceleration is applied in the vertical direction (the direction in which detection is made), signals are output from the Wheatstone bridge as the resistances of all strain gauges change. Consequently, the signal output increases.

Figure 18A:
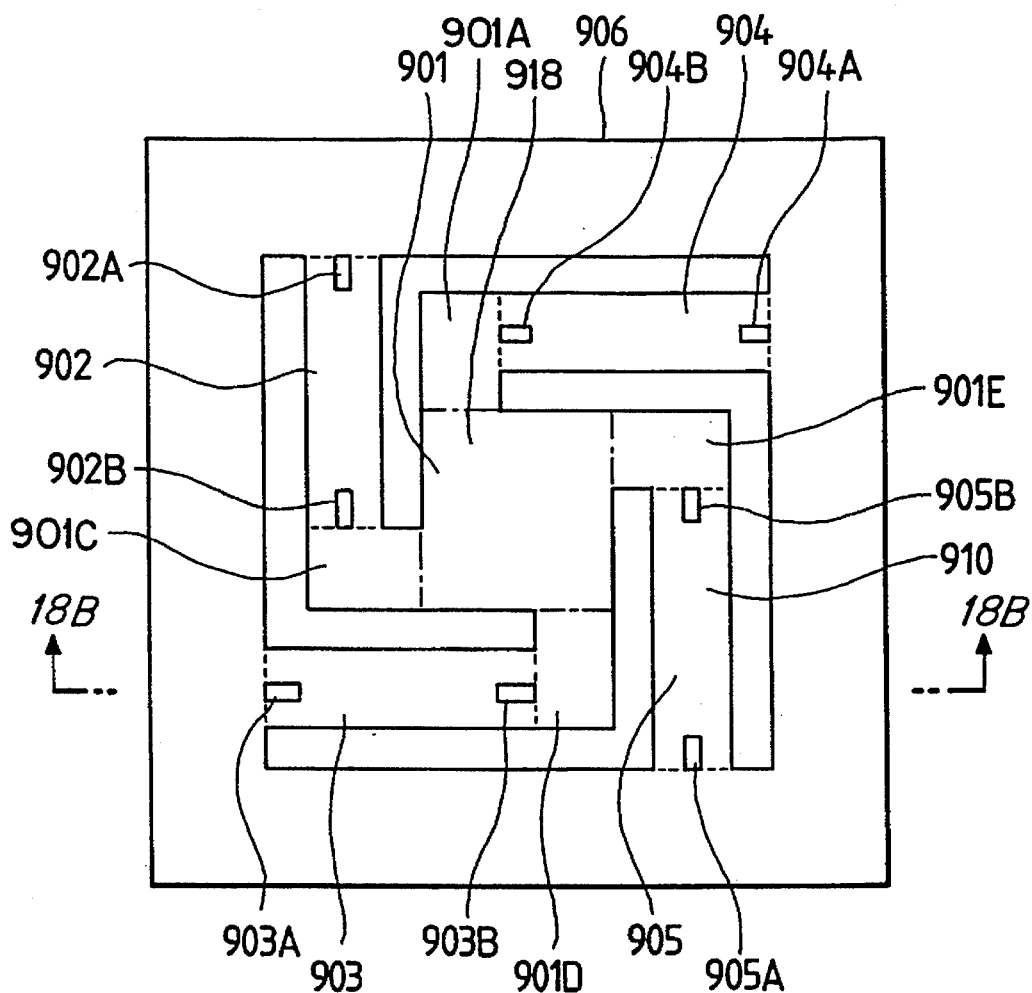
FIG. 18A is a top view of another semiconductor acceleration sensor of the tenth embodiment of the present invention.
Figure 18B:
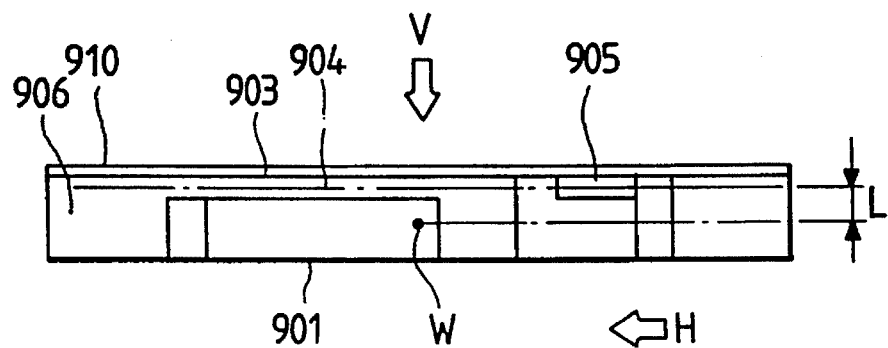
FIG. 18B is a sectional view taken on line 18B—18B of FIG. 18A.

FIGS. 18A and 18B illustrate another semiconductor acceleration sensor embodying the present invention: FIG. 18A is a top view and FIG. 18B is a sectional view taken on line B—B of FIG. 18A. As shown in FIGS. 18A and 18B, the semiconductor acceleration sensor is formed of a semiconductor and includes a weight 901 having a square thick-walled central portion 918 which is, for example, 400 microns thick and four square thick-walled protrusions 901A, 901B, 901C, 901D formed on the respective sides of the central portion 901A, the sides thereof making a right angle with each other about the center of the central portion 901A, a thick-walled support 906 having an inner square opening set a predetermined space apart from the outer sides of the protrusions 901A, 901B, 901C, 901D of the weight 901 and formed in such a way as to surround the weight 901, four thin-walled beams 902, 903, 904, 905, which are, for example, 20 to 40 microns thick, for coupling the one sides of the protrusions 901A, 901B, 901C, 901D of the weight 901, the sides thereof making a right angle with each other about the center of the central portion 901A of the weight 901, to the respective opposed inner sides of the support 906, and strain gauges 902A, 902B, 903A, 903B, 904A, 904B, 905A, 905B formed in the respective beams 902, 903, 904, 905. The strain gauges 902A, 903A, 904A, 905A among all these gauges are formed in the top surfaces of the junctions between the beams and the support in the lengthwise direction of the beams, respectively. On the other hand, the strain gauges 902B, 903A, 904B, 905B are formed in the top surfaces of the junctions between the beams and the weight in the lengthwise direction of the beams, respectively. Like those shown in FIGS. 17A and 17B, the strain gauges constitute the Wheatstone bridge likewise and operate in exactly the same way as in FIGS. 17A and 17B.

Since the beams 902, 903, 904, 905 are formed along the respective sides of the central portion 901A of the weight 901 in this semiconductor acceleration sensor, their lengthwise sides can be made longer and thereby the beams become readily bent, thus improving detection sensitivity further.

In this case, the protrusions 901A, 901B, 901C, 901D provided on the respective sides of the weight 901 may be provided at one ends of the respective sides thereof in order to form each of the beams 902, 903, 904, 905 on one of two sides of the protrusion, the one side being spaced away more than the other side from the opposed inner side of the support 906. In this way, the length of the beams can be made greater.

In addition, passivation films 910 of SiO2, SiN or the like are formed to protect the strain gauges in the top surface of the semiconductor acceleration sensor shown in FIGS. 17A and 17B or what is shown in FIGS. 18A and 18B. The passivation film is normally formed at temperatures of as high as hundreds of degrees and put back to the normal temperature. However, the difference in thermal expansion coefficient between the. passivation film and the silicon semiconductor causes stress to remain on the surface of the silicon semiconductor. Although the resistances of the strain gauges 902A, 902B, 903A, 903B, 904A, 904B, 905A, 905B vary accordingly, the same resistance change is produced because all the strain gauges are provided in the longitudinal direction of the top surfaces of the beams. Since these strain gauges are entailing resistance changes alike when they are connected to the Wheatstone bridge of FIG. 5, these resistance changes are mutually offset and this prevents an offset output from being generated.

Each of the semiconductor acceleration sensors described above has a configuration by which the impact resistance of the sensor is improved, and can be accommodated in a hermetically sealed container which contains an inert, gas instead of a conventional hermetically sealed container which contains a damping liquid, thereby improving the production yield.

As described the above, in the semiconductor acceleration sensors according to the present invention, the level of an interference output is reduced, the working accuracy of the engraving process in the production is improved, and the impact resistance is improved so that the sensor is not required to be accommodated in a hermetically sealed container which contains a damping liquid. According to the invention, therefore, a high-performance and low-cost semiconductor acceleration sensor having an excellent detection accuracy and an improved production yield can be provided.

As the present invention is aimed to improve detection sensitivity and to lower the interference and offset outputs without the necessity of any additional process step by devising the configuration of the semiconductor acceleration sensor formed of a semiconductor, the number and the positions of the strain gauges, and the method of connecting them to be formed therein, it is possible to supply a high-performance semiconductor acceleration sensor at low cost. A semiconductor acceleration sensor of this sort is fit for various uses, to say nothing of automotive use. The present invention adds a striking effect to supplying high-performance semiconductor acceleration sensors at low cost.

What is claimed is:

1. A semiconductor acceleration sensor comprising:

a thick weight made of a semiconductor;

a thick support member separated by a predetermined gap from said thick weight and surrounding said thick weight; first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight; and strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, said first type strain gauges being respectively formed on the upper faces of said first and second pairs of beams on a portion of each beam of said pairs near the connection thereof to said support member and in the longitudinal direction of the respective beam, and said second type strain gauges being respectively formed on the upper faces of said first and second pairs of beams on a portion of each beam of said pairs near the connection thereof to said support member and in the width direction of the respective beam, wherein said thick weight, said support member and said beams are formed from one semiconductor substrate, and working widths of engraved portions for forming said weight, said support member and said beams are identical with each other, said engraved portions being engraved from the upper and lower faces of said semiconductor substrate.

2. A semiconductor acceleration sensor according to claim 1, wherein said sensor is accommodated in a container which contains an inert gas.

3. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight; and strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, said first type strain gauges being respectively formed on the upper faces of said first and second pairs of beams on a portion of each beam of said pairs near the connection thereof to said support member and in the longitudinal direction of the respective beam, and said second type strain gauges being respectively formed on the upper faces of said first and second pairs of beams on a portion of each beam of said pairs near the connection thereof to said support member and in the width direction of the respective beam, wherein said support member comprises a plurality of signal terminals on one side which are connected to said first and second type strain gauges formed on the upper faces of said beams, and a plurality of dummy signal terminals on another side and having the same shape as said plurality of signal terminals, said plurality of signal terminals and said plurality of dummy signal terminals being arranged on the periphery of the upper face of said support member at substantially equal intervals, said semiconductor acceleration sensor further comprises a supporting substrate comprising a plurality of signal terminals and a plurality of dummy signal terminals which are respectively opposed and connected to said plurality of signal terminals and said plurality of dummy signal terminals of the support member, said supporting substrate functioning to connect said first and second type strain gauges formed on said beams to the exterior through said plurality of signal terminals of the supporting substrate, and the sum of the height of each of said plurality of signal terminals of the support member and that of each of said plurality of signal terminals of the supporting substrate, and the sum of the height of each of said plurality of dummy signal terminals of the support member and that of each of said plurality of dummy signal terminals of the supporting substrate being set to be a dimension which is slightly greater than a displacement amount of said thick weight during operation.

4. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, said first type strain gauges being respectively formed on the upper faces of said first and second pairs of beams on a portion of each beam of said pairs near the connection thereof to said support member and in the longitudinal direction of the respective beam, and said second type strain gauges being respectively formed on the upper faces of said first and second pairs of beams on a portion of each beam of said pairs near the connection thereof to said support member and in the width direction of the respective beam; and an additional weight and stopper disposed on the upper face of said thick weight and having an inverse convex shape, the outer periphery of said additional weight and stopper being greater than the inner periphery of said support member, the gap between the lower face of the outer periphery portion of said additional weight and stopper and the upper face of said support member being set to be a dimension which is smaller than an allowable displacement amount of said thick weight.

5. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and said second type strain gauges, said first type strain gauges and second type strain gauges having different output characteristics in response to the force applied to said thick weight, said first type strain gauges being respectively formed on the upper faces of said first and second pairs of beams on a portion of each beam of said pairs near the connection thereof to said support member and in the longitudinal direction of the respective beam, and said second type strain gauges being respectively formed on the upper faces of said first and second pairs of beams on a portion of each beam of said pairs near the connection thereof to said support member and in the width direction of the respective beam; and a supporting substrate disposed on the lower face of said support member and having a recess which opens upward, said upwardly opening recess being greater than that of said thick weight, the gap between the face of said upwardly opening recess and the lower face of said thick weight being set to be a dimension which is slightly greater than a displacement amount of said thick weight during operation.

6. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, said first type strain gauges being respectively formed on the upper faces of said first and second pairs of beams on a portion of each beam of said pairs near the connection thereof to said support member and in the longitudinal direction of the respective beam, and said second type strain gauges being respectively formed on the upper faces of said first and second pairs of beams on a portion of each beam of said pairs near the connection thereof to said support member and in the width direction of the respective beam;

an upper supporting substrate disposed on the upper face of said support member and having a recess which opens downward, said downwardly opening recess being greater than that of said thick weight, a plurality of downward projections being formed in said downwardly opening recess and at locations which face the outer periphery of said thick weight; and a lower supporting substrate disposed on the lower face of said support member and having a recess which opens upward, said upwardly opening recess being greater than that of said thick weight, a plurality of upward projections being formed in said upwardly opening recess and at locations which face the outer periphery of said thick weight, the gaps between the upper and lower faces of said thick weight and the faces of said downwardly opening recess of said upper supporting substrate and said upwardly opening recess of said lower supporting substrate being set to be a dimension which is slightly greater than a displacement amount of said thick weight during operation, the gaps between the upper and lower faces of said thick weight and said downward and upward projections formed respectively in said downwardly opening recess of said upper supporting substrate and said upwardly opening recess of said lower supporting substrate being set to be a dimension which is smaller than an allowable displacement amount of said thick weight.

7. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, said first type strain gauges being respectively formed on the upper faces of first and second pairs of beams on a portion of each beam of said pairs near the connection thereof to said support member and in the longitudinal direction of the respective beam, and said second type strain gauges being respectively formed on the upper faces of said first and second pairs of beams on a portion of each beam of said pairs near the connection thereof to said support member and in the width direction of the respective beam;

an upper supporting substrate disposed on the upper face of said support member and having a recess which opens downward, said downwardly opening recess being greater than that of said thick weight, a downward projection being formed in said downwardly opening recess and at a location which faces the outer periphery of said thick weight; and a lower supporting substrate disposed on the lower face of said support member and having a recess which opens upward, said upwardly opening recess being greater than that of said thick weight, an upward projection being formed in said upwardly opening recess and at a location which faces the outer periphery of said thick weight, the gaps between the upper and lower faces of said weight and the faces of said downwardly opening recess of said upper substrate and said upwardly opening recess of said lower supporting substrate being set to be a dimension which is slightly greater than a displacement amount of said weight during operation, the gaps between the upper and lower faces of said thick weight and said downward and upward projections formed respectively in said downwardly opening recess of said upper supporting substrate and said upwardly opening recess of said lower supporting substrate being set to be a dimension which is smaller than an allowable displacement amount of said thick weight.

8. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said pairs coinciding with the other beam of each of said pairs when said one beam is rotated by 180 degrees about the center of said thick weight; and strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, wherein said first type strain gauges are respectively formed on the upper faces of said first and second pairs of beams on a portion of each beam of said pairs near the connection thereof to said support member and in the longitudinal direction of the respective beams, and said second type strain gauges are respectively formed on the upper faces of said first and second pairs of beams on a portion of each beam of said pairs near the connection thereof to said thick weight and in the longitudinal direction of the respective beams.

9. A semiconductor acceleration sensor according to claim 8, wherein said strain gauge means constitute a Wheatstone bridge in which said first type strain gauges respectively formed on said first pair of thin beams are opposed to said first type strain gauges respectively formed on said second pair of thin beams, and said second type strain gauges respectively formed on said first pair of beams are opposed to said second type strain gauges respectively formed on said second pair of thin beams.

10. A semiconductor acceleration sensor according to claim 8, wherein said thick weight, said support member and said beams are formed from one semiconductor substrate, and working widths of engraved portions for forming said weight, said support member and said beams are identical with each other, said engraved portions being engraved from the upper and lower faces of said semiconductor substrate.

11. A semiconductor acceleration sensor according to claim 8, wherein said sensor is accommodated in a container which contains an inert gas.

12. A semiconductor acceleration sensor according to claim 8, further comprising a passivation film for protecting said first and second type strain gauges.

13. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight; and strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, wherein said first type strain gauges are respectively formed on the upper faces of said first and second pairs of beams on a portion of each beam of said pairs near the connection thereof to said support member and in the longitudinal direction of the respective beams, and said second type strain gauges are respectively formed on the upper faces of said first and second pairs of beams on a portion of each beam of said pairs near the connection thereof to said thick weight and in the longitudinal direction of the respective beams, wherein said support member comprises a plurality of signal terminals connected to said first and second type strain gauges formed on the upper faces of said beams, and a plurality of dummy signal terminals on another side having the same shape as said plurality of signal terminals, said plurality of signal terminals and said plurality of dummy signal terminals being arranged in the periphery of the upper face of said support member at substantially equal intervals, said semiconductor acceleration sensor further comprising a supporting substrate comprising a plurality of signal terminals and a plurality of dummy signal terminals which are respectively opposed and connected to said plurality of signal terminals and said plurality of dummy signal terminals of the supporting member, said supporting substrate functioning to connect said first and second type strain gauges formed on said beams to the exterior through said signal terminals of the supporting member, and the sum of the height of each of said plurality of signal terminals of the support member and that of each of said plurality of signal terminals of the supporting substrate, and the sum of the height of each of said plurality of dummy signal terminals of the support member and that of each of said plurality of dummy signal terminals of the supporting substrate being set to be a dimension which is slightly greater than a displacement amount of said thick weight during operation.

14. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, wherein said first type strain gauges are respectively formed on the upper faces of said first and second pairs of beams on a portion of each beam of said pairs near the connection thereof to said support member and in the longitudinal direction of the respective beams, and said second type strain gauges are respectively formed on the upper faces of said first and second pairs of beams on a portion of each beam of said pairs near the connection thereof to said thick weight and in the longitudinal direction of the respective beams; and an additional weight and stopper disposed on the upper face of said thick weight and having an inverse convex shape, the outer periphery of said additional weight and stopper being greater than the inner periphery of said support member, the gap between the lower face of the outer periphery portion of said additional weight and stopper and the upper face of said support member being set to be a dimension which is smaller than an allowable displacement amount of said thick weight.

15. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, wherein said first type strain gauges are respectively formed on the upper faces of said first and second pairs of beams on a portion of each beam of said pairs near the connection thereof to said support member and in the longitudinal direction of the respective beams, and said second type strain gauges are respectively formed on the upper faces of said first and second pairs of beams on a portion of each beam of said pairs near the connection thereof to said thick weight and in the longitudinal direction of the respective beams; and a supporting substrate disposed on the lower face of said support member and having a recess which opens upward, said upwardly opening recess being greater than that of said thick weight, the gap between the face of said upwardly opening recess and the lower face of said thick weight being set to be a dimension which is slightly greater than a displacement amount of said thick weight during operation.

16. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, wherein said first type strain gauges are respectively formed on the upper faces of said first and second pairs of beams on a portion of each beam of said pairs near the connection thereof to said support member and in the longitudinal direction of the respective beams, and said second type strain gauges are respectively formed on the upper faces of said first and second pairs of beams on a portion of each beam of said pairs near the connection thereof to said thick weight and in the longitudinal direction of the respective beams;

an upper supporting substrate disposed on the upper face of said support member and having a recess which opens downward, said downwardly opening recess being greater than that of said thick weight, a plurality of downward projections being formed in said downwardly opening recess and at locations which face the outer periphery of said thick weight; and a lower supporting substrate disposed on the lower face of said support member and having a recess which opens upward, said upwardly opening recess being greater than that of said thick weight, a plurality of upward projections being formed in said upwardly opening recess and at locations which face the outer periphery of said thick weight, the gaps between the upper and lower faces of said thick weight and the faces of said downwardly opening recess of said upper supporting substrate and said upwardly opening recess of said lower supporting substrate being set to be a dimension which is slightly greater than a displacement amount of said thick weight during operation, the gaps between the upper and lower faces of said thick weight and said downward and upward projections formed respectively in said downwardly opening recess of said upper supporting substrate and said upwardly opening recess of lower supporting substrate being set to be a dimension which is smaller than an allowable displacement amount of said thick weight.

17. A semiconductor acceleration sensor comprising:

a thick weight made of a semiconductor;

a thick support member separated by a predetermined gap from said thick weight and surrounding said thick weight;

first and second pairs of thin beams, separated from each other by an angle of 90 degrees about the center of said thick weight, which connect the outer periphery of said weight with the inner periphery of said support member, one beam of each of said first and second pairs of thin beams coinciding with the other beam of each of said first and second pairs of thin beams when said one beam is rotated by 180 degrees about the center of said thick weight;

strain gauge means formed on upper faces of said first and second pairs of beams, for measuring a force applied to said thick weight, comprising first type strain gauges and second type strain gauges, said first type strain gauges and said second type strain gauges having different output characteristics in response to the force applied to said thick weight, wherein said first type strain gauges are respectively formed on the upper faces of said first and second pairs of beams on a portion of each beam of said pairs near the connection thereof to said support member and in the longitudinal direction of the respective beams, and said second type strain gauges are respectively formed on the upper faces of said first and second pairs of beams on a portion of each beam of said pairs near the connection thereof to said thick weight and in the longitudinal direction of the respective beams;

an upper supporting substrate disposed on the upper face of said support member and having a recess which opens downward, said downwardly opening recess being greater than that of said thick weight, a downward projection being formed in said downwardly opening recess and at a location which faces the outer periphery of said thick weight; and a lower supporting substrate disposed on the lower face of said support member and having a recess which opens upward, said upwardly opening recess being greater than that of said thick weight, an upward projection being formed in said upwardly opening recess and at a location which faces the outer periphery of said thick weight, the gaps between the upper and lower faces of said thick weight and the faces of said downwardly opening recess of said upper substrate and said upwardly opening recess of said lower supporting substrate being set to be a dimension which is slightly greater than a displacement amount of said thick weight during operation, the gaps between the upper and lower faces of said thick weight and said downward and upward projections formed respectively in said downwardly opening recess of said upper supporting substrate and said upwardly opening recess of said lower supporting substrate being set to be a dimension which is smaller than an allowable displacement amount of said thick weight.

18. A semiconductor acceleration sensor formed of a semiconductor, said sensor including a square thick-walled weight having four external sides, a thick-walled support set a predetermined space apart from the square thick-walled weight and provided with an inner square opening, having four inner sides formed in such a way as to surround the square thick-walled weight, four thin-walled beams each having opposite ends, two thin-walled beams on opposing external sides of the square thick-walled weight, for coupling the opposed external sides of the square thick-walled weight at one end of the respective beams, to respective opposed inner sides of the support at the opposite end of the respective beams, and strain gauges formed at both ends of the respective beams.

19. A semiconductor acceleration sensor as claimed in claim 18, wherein said strain gauges formed in the four beams include four first strain gauges on a first side, said first four strain gauges being respectively formed in the top surfaces of the junctions between the beams and a support in the lengthwise direction of the beams, and four second strain gauges on a second side, said four second strain gauges on the second side being respectively formed in the top surfaces of the junctions between the beams and the square thick-walled weight in the lengthwise direction thereof and wherein a Wheatstone bridge is set up by making two of the strain gauges of the four first strain gauges constituting a first side strain gauge respectively face the remaining two strain gauges of the four first strain gauges symmetrically about the center point of the square thick-walled weight and by making two of the strain gauges of the four second strain gauges constituting a second side strain gauges respectively face the remaining two strain gauges of the four second strain gauges symmetrically about the center point of the square thick-walled weight.

20. A semiconductor acceleration sensor as claimed in claim 19, wherein passivation films are provided on the surfaces of the first and second respective beams on which the strain gauges being formed.

21. A semiconductor acceleration sensor formed of a semiconductor, said sensor including a weight having a square thick-walled central portion with four sides and four square thick-walled protrusions formed on each of the four sides of the central portion, the sides of said four square thick-walled protrusions making a right angle with each other about the center of the central portion, a thick-walled support having an inner square opening set a predetermined space apart from the outer sides of the protrusions of the weight and formed in such a way as to surround the weight, four thin-walled beams for coupling the sides of the protrusions of the weight, the sides thereof making a right angle with each other about the center of the central portion of the weight, and strain gauges formed in the respective beams.

22. A semiconductor acceleration sensor as claimed in claim 21, wherein said strain gauges formed in the four beams include four first strain gauges on a first side, the four first strain gauges being respectively formed in the top surfaces of first junctions between the beams and the support in the lengthwise direction of the beams, and four second strain gauges on a second side, the four second strain gauges being respectively formed in the top surfaces of first junctions between the beams and the weight in the lengthwise direction thereof and wherein a Wheatstone bridge is set up by making two of the strain gauges of the four first strain gauges constituting the first side strain gauges respectively face the remaining two strain gauges of the four first strain gauges symmetrically about the center point of the weight and by making two of the strain gauges out of the four second strain gauges constituting the second side strain gauges respectively face the remaining two strain gauges of the four second strain gauges symmetrically about the center point of the weight.

23. The semiconductor acceleration sensor as claimed in claim 21, wherein said strain gauges are formed in the respective beams at both ends thereof in a longitudinal direction of the respective beams.

24. A semiconductor acceleration sensor as claimed in claim 22, wherein passivation films are provided on the surfaces of the respective beams on which the first and second strain gauges being formed.

* * * * *